US012538122B2

(12) United States Patent
Suh

(10) Patent No.: US 12,538,122 B2
(45) Date of Patent: Jan. 27, 2026

(54) METHOD AND DEVICE FOR SUPPORTING SECURITY OF APPLICATION BY USING NAS MESSAGE IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 18/271,599

(22) PCT Filed: Jan. 12, 2022

(86) PCT No.: PCT/KR2022/000570
§ 371 (c)(1),
(2) Date: Jul. 10, 2023

(87) PCT Pub. No.: WO2022/154484
PCT Pub. Date: Jul. 21, 2022

(65) Prior Publication Data
US 2024/0080662 A1 Mar. 7, 2024

(30) Foreign Application Priority Data

Jan. 13, 2021 (KR) .................. 10-2021-0004935
Jan. 11, 2022 (KR) .................. 10-2022-0004306

(51) Int. Cl.
*H04W 12/041* (2021.01)
*H04L 9/08* (2006.01)

(52) U.S. Cl.
CPC ......... *H04W 12/041* (2021.01); *H04L 9/0869* (2013.01)

(58) Field of Classification Search
CPC .. H04L 9/0869; H04W 12/037; H04W 12/04; H04W 12/041; H04W 12/06; H04W 12/30
See application file for complete search history.

(56) References Cited

U.S. PATENT DOCUMENTS

| | | | |
|---|---|---|---|
| 7,835,528 B2 * | 11/2010 | Bajko | H04L 9/0891 380/278 |
| 8,412,943 B2 * | 4/2013 | Pang | G06Q 20/388 713/168 |

(Continued)

FOREIGN PATENT DOCUMENTS

| | | |
|---|---|---|
| CN | 110891271 A | 3/2020 |
| CN | 111866874 A | 10/2020 |

(Continued)

OTHER PUBLICATIONS

3GPP TS 33.501 version 16.3.0 Release 16, Security architecture and procedures for 5G System (Aug. 2020) (Year: 2020).*

(Continued)

*Primary Examiner* — Sharon S Lynch
(74) *Attorney, Agent, or Firm* — Jefferson IP Law, LLP

(57) ABSTRACT

The present disclosure relates to a technique of supporting security in a wireless communication system. According to an embodiment of the disclosure, in case that a master key of a security key is generated at an authentication server function (AUSF) according to a message for notifying about expiration of the security key used in communication between the UE and an application function (AF) being received at the AUSF, the UE may receive an authentication request message including random number information used in generation of the masker key from an access and mobility management function (AMF) connected to the AUSF, may transmit an authentication request response message, based on reception of the authentication request message, and may (Continued)

generate the master key, based on the received random number information, wherein the authentication request message is transmitted from the AMF to the UE when a key refresh triggering message including the random number information is received by the AMF from the AUSF.

14 Claims, 12 Drawing Sheets

(56) References Cited

U.S. PATENT DOCUMENTS

| | | | |
|---|---|---|---|
| 10,516,585 B2 | 12/2019 | Parandehgheibi et al. | |
| 10,728,757 B2* | 7/2020 | Wu | H04W 36/08 |
| 11,228,905 B2* | 1/2022 | Wu | H04W 12/06 |
| 11,863,665 B2* | 1/2024 | Kunz | H04L 9/0833 |
| 11,937,079 B2* | 3/2024 | Ito | H04W 12/06 |
| 2007/0074275 A1* | 3/2007 | Bajko | H04L 9/3271 |
| | | | 726/4 |
| 2010/0250952 A1* | 9/2010 | Pang | G06Q 20/4097 |
| | | | 713/176 |
| 2019/0274038 A1* | 9/2019 | Wu | H04W 36/08 |
| 2020/0128403 A1* | 4/2020 | Wu | H04W 36/0033 |
| 2021/0051005 A1* | 2/2021 | Kunz | H04W 12/04 |
| 2022/0053446 A1* | 2/2022 | Deng | H04W 12/06 |

FOREIGN PATENT DOCUMENTS

| | | | |
|---|---|---|---|
| KR | 10-1139558 B1 | 4/2012 | |
| WO | WO2020151581 A1 * | 7/2020 | ........... H04L 9/0891 |

OTHER PUBLICATIONS

Translation of WO2020151581A1 (published Jul. 30, 2020) from google patents (obtained Sep. 11, 2025) (Year: 2020).*

ZTE; the KAF lifetime expiration in clause 5.2; 3GPP TSG-SA3 Meeting #102-e; S3-210156; Revision of S3-210156; Jan. 18-19, 2021; e-meeting.

Samsung; Network provides authorization to AF/UE for KAF Key refresh; 3GPP TSG-SA3 Meeting #102-e; S3-210447; Jan. 18-19, 2021; e-meeting, Online.

3GPP; 3rd Generation Partnership Project; Technical Specification Group Services and System Aspects; Authentication and Key Management for Applications (AKMA); based on 3GPP credentials in the 5G System (5GS) (Release 17); 3GPP TS 33.535 V17.0.0 (Dec. 2020); Dec. 16, 2020; Valbonne, France.

International Search report with Written Opinion and English translation dated Mar. 25, 2022; International Appln. No. PCT/KR2022/000570.

* cited by examiner

METHOD AND DEVICE FOR SUPPORTING SECURITY OF APPLICATION BY USING NAS MESSAGE IN WIRELESS COMMUNICATION SYSTEM

TECHNICAL FIELD

The present disclosure relates to an apparatus and method for supporting security of an application in a wireless communication system. More particularly, the present disclosure relates to a method and apparatus for processing non access stratum (NAS) for protecting security of an application in a user equipment (UE) and a network.

BACKGROUND ART

Considering the development of wireless communication from generation to generation, technologies have been developed mainly for services targeting humans, such as voice calls, multimedia services, data services, and the like. Following the commercialization of $5^{th}$ generation (5G) communication systems, it is expected that connected devices that have been exponentially growing will be connected to communication networks. Examples of things connected to networks may include vehicles, robots, drones, home appliances, displays, smart sensors connected to various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the $6^{th}$ generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 μsec. That is, the 6G communication systems will be 50 times as fast as 5G communication systems and have ¹/₁₀ the radio latency thereof.

In order to achieve such a high data rate and ultra-low latency, it has been considered to implement the 6G communication systems in a terahertz band (for example, 95 GHz to 3 THz bands). It is expected that, due to more severe path loss and atmospheric absorption in the terahertz bands than those in mmWave bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion about new technologies such as metamaterial-based lenses and antennas, a high-dimensional spatial multiplexing technology using orbital angular momentum (OAM), reconfigurable intelligent surface (RIS), and the like.

Moreover, in order to improve spectral efficiency and overall network performance, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will facilitate the next hyper-connected experience. In more detail, it is expected that services such as truly immersive extended reality (XR), high-fidelity mobile hologram, and digital replica could be provided through the 6G communication systems. In addition, services such as remote surgery for security and reliability enhancement, industrial automation, and emergency response will be provided through the 6G communication system, such that the technologies could be applied in various fields such as industry, medical care, automobiles, home appliances, and the like.

DISCLOSURE

Technical Problem

The present disclosure relates to an apparatus and method for supporting security of an application in a wireless communication system, and provides a process of updating a security key when an expiration time of the security key used in a user equipment (UE) and an application function (AF) is ended.

Technical Solution

According to an embodiment of the disclosure, in case that a master key of a security key is generated at an authentication server function (AUSF) according to a message for notifying about expiration of the security key used in communication between the UE and an application function (AF) being received at the AUSF, the UE may receive an authentication request message including random number information used in generation of the masker key from an access and mobility management function (AMF) connected to the AUSF, may transmit an authentication request response message, based on reception of the authentication request message, and may generate the master key, based on the received random number information, wherein the authentication request message is transmitted from the AMF to the UE when a key refresh triggering message including the random number information is received by the AMF from the AUSF.

BEST MODE

Figure 1:
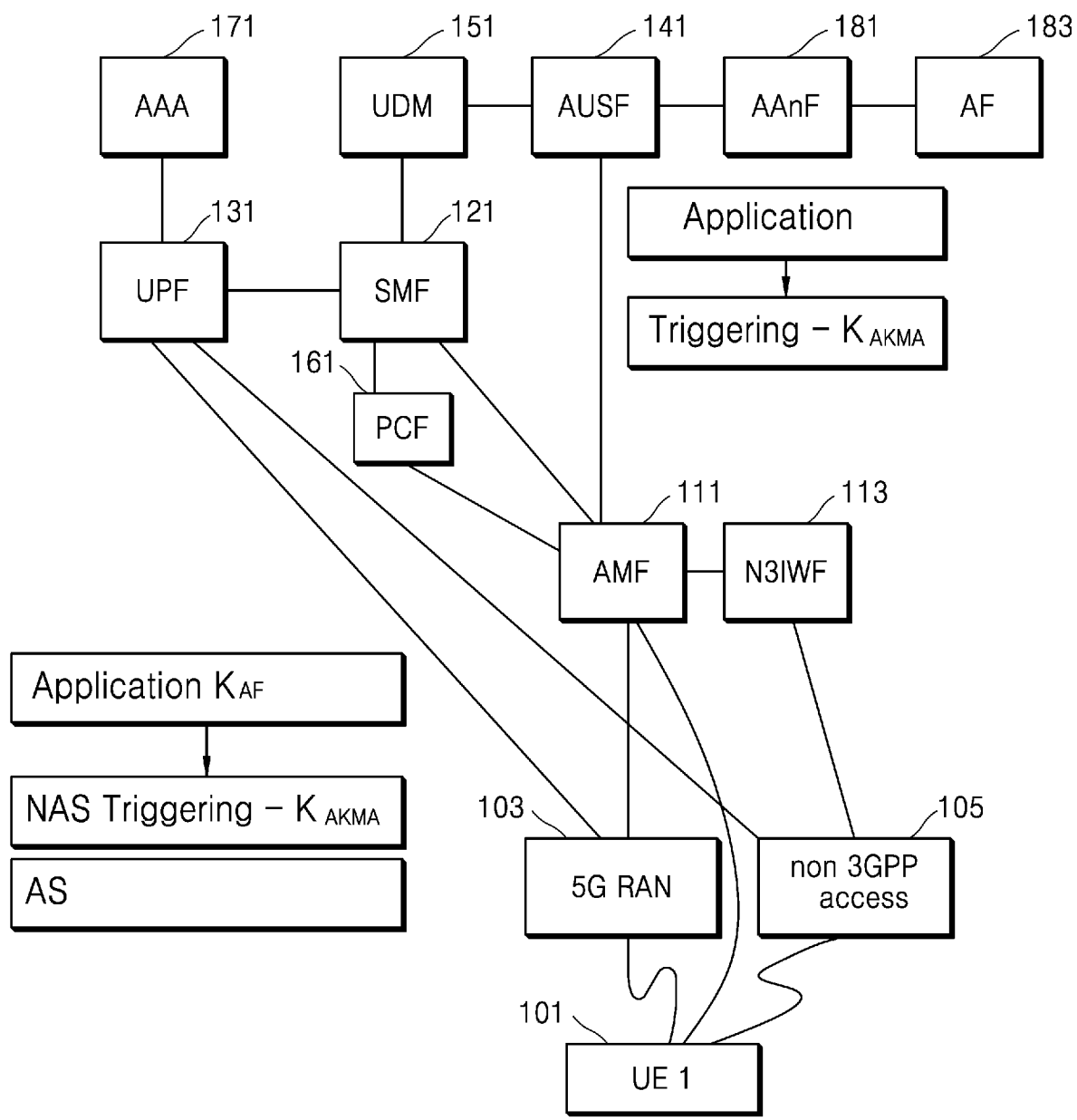
FIG. 1 illustrates an embodiment of a communication environment for supporting security of an application in a $5^{th}$ generation (5G) network, according to an embodiment of the present disclosure.

According to an embodiment of the disclosure, a user equipment (UE) for supporting security in a wireless communication system may include: a transceiver; and a processor coupled with the transceiver and configured to, in case that a master key of a security key is generated at an authentication server function (AUSF) according to a message for notifying about expiration of the security key used in communication between the UE and an application function (AF) being received at the AUSF, receive an authentication request message including random number information used in generation of the masker key from an access and mobility management function (AMF) connected to the AUSF, transmit an authentication request response message, based on reception of the authentication request message, and generate the master key, based on the received random number information, wherein the authentication request message is transmitted from the AMF to the UE when a key refresh triggering message including the random number information is received by the AMF from the AUSF.

According to an embodiment of the disclosure, in the UE for supporting security in a wireless communication system, the processor may be configured to identify expiration of the master key, based on reception of the authentication request message.

According to an embodiment of the disclosure, in the UE for supporting security in a wireless communication system, the message for notifying about expiration of the first security key may be received by the AUSF from the AF via an AKMA anchor function (AAnF), based on the expiration of the first security key being identified by the AF.

According to an embodiment of the disclosure, in the UE for supporting security in a wireless communication system, the message for notifying about expiration of the first security key may be received by the AUSF from an AAnF, based on the expiration of the first security key being identified by the AAnF.

According to an embodiment of the disclosure, a user equipment (UE) for supporting security in a wireless communication system may include: a transceiver; and a processor coupled with the transceiver and configured to, when a security key used in communication between the UE and an application function (AF) is expired, generate random number information associated with a master key of the security key, transmit, to a base station, a key generation request message including the generated random number information, and when the random number information included in the key generation request message is transmitted to an authentication server function (AUSF) from an access and mobility management function (AMF) having received the request message, and the AUSF generates a master key, based on the key generation request message, receive an authentication request message from the AMF via the base station, based on a message about the master key being received by the AMF from the AUSF.

According to an embodiment of the disclosure, in the UE for supporting security in a wireless communication system, the processor may be configured to, when transmitting the key generation request message, generate the master key, based on the random number information.

According to an embodiment of the disclosure, in the UE for supporting security in a wireless communication system, the processor may be configured to, when the authentication request message is received from the AMF via the base station, generate the master key, based on the random number information.

According to an embodiment of the disclosure, in the UE for supporting security in a wireless communication system, the authentication request message received from the AMF via the base station may include random number information used by the AMF to generate the master key, and the processor may be configured to generate the master key by using the random number information generated by the UE or the random number information used by the AMF to generate the master key.

According to an embodiment of the disclosure, a method of supporting security by a user equipment (UE) in a wireless communication system may include: in case that a master key of a security key is generated at an authentication server function (AUSF) according to a message for notifying about expiration of the security key used in communication between the UE and an application function (AF) being received at the AUSF, receiving an authentication request message including random number information used in generation of the masker key from an access and mobility management function (AMF) connected to the AUSF; transmitting an authentication request response message, based on reception of the authentication request message; and generating the master key, based on the received random number information, wherein the authentication request message is transmitted from the AMF to the UE when a key refresh triggering message including the random number information is received by the AMF from the AUSF.

According to an embodiment of the disclosure, a method of supporting security by a user equipment (UE) in a wireless communication system may include: when a security key used in communication between the UE and an application function (AF) is expired, generating random number information associated with a master key of the security key; transmitting, to a base station, a key generation request message including the generated random number information; and when the random number information included in the key generation request message is transmitted to an authentication server function (AUSF) from an access and mobility management function (AMF) having received the request message, and the AUSF generates a master key, based on the key generation request message, receiving an authentication request message from the AMF via the base station, based on a message about the master key being received by the AMF from the AUSF.

MODE FOR INVENTION

Hereinafter, embodiments of the present disclosure will now be described more fully with reference to the accompanying drawings. In the descriptions of the present disclosure, certain detailed explanations of the related art which are well known in the art to which the present disclosure belongs and are not directly related to the present disclosure are omitted. By omitting unnecessary explanations, the essence of the present disclosure may not be obscured and may be explicitly conveyed.

For the same reason, some elements in the drawings are exaggerated, omitted, or schematically illustrated. Also, the size of each element does not entirely reflect the actual size. In the drawings, the same or corresponding elements are denoted by the same reference numerals.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

It will be understood that each block of flowchart illustrations, and combinations of blocks in the flowchart illustrations, may be implemented by computer program instructions.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, for example, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to an embodiment, a " . . . unit" may include one or more processors.

Hereinafter, terms identifying an access node, terms indicating network entities, terms indicating messages, terms indicating an interface between network entities, and terms indicating various pieces of identification information, as used in the following description, are exemplified for convenience of descriptions. Therefore, the present disclosure is not limited to terms to be described below, and other terms indicating objects having equal technical meanings may be used.

For convenience of descriptions, in the present disclosure, terms and names or modifications of the terms and names defined in the $3^{rd}$ Generation Partnership Project Long Term Evolution (3GPP LTE) standard are used therein. However, the present disclosure is not limited to these terms and names, and may be equally applied to wireless communication systems conforming to other standards. In the present disclosure, an evolved node B (eNB) may be interchangeably used with a next-generation node B (gNB) for convenience of descriptions. That is, a base station (BS) described by an eNB may represent a gNB. In the present disclosure, the term "user equipments (UEs)" may refer to not only mobile phones, narrowband Internet of Things (NB-IoT) devices, and sensors but also other wireless communication devices.

That is, when particularly describing embodiments of the present disclosure, the communication standards defined by the 3GPP are mainly applied but the essential concept of the present disclosure may be modified without departing from the scope of the present disclosure and may be applied to other communication system based on similar technical backgrounds, and the application may be made based on determination by one of ordinary skill in the art.

FIG. 1 illustrates a first embodiment of a UE and a network environment for performing communication in which communication performance is improved in a $5^{th}$ generation (5G) network, according to an embodiment of the present disclosure.

Referring to FIG. 1, a 5G or new radio (NR) core network system may include network functions (NFs) such as a user plane function (UPF) 131, a session management function (SMF) 121, an access and mobility management function (AMF) 111, a 5G radio access network (RAN) 103, a user data management (UDM) 151, a policy control function (PCF) 161, and the like.

Also, in order to authenticate entities above, the 5G or NR core network system may include entities including an authentication server function (AUSF) 141 and authentication, authorization and accounting (AAA) 171. A UE (terminal) 101 may access the 5G core network via the 5G RAN (base station (BS)) 103.

A UDM is an entity for storing security-associated information such as a user security key or the like, user subscription-associated information, or the like.

A non-3GPP interworking function (N3IWF) exists for a case in which a UE communicates via non 3GPP access, and when communicating via non 3GPP access, session management may be controlled via the UE, the non 3GPP access, the N3IWF, and the SMF, and mobility management may be controlled via the UE, the non 3GPP access, the N3IWF, and the AMF.

In the 5G or NR system, an entity for managing mobility management and session management is divided into the AMF 111 and the SMF 121. For the 5G or NR system, standalone deployment architecture in which only 5G communication entities perform communication, and non-standalone deployment architecture in which 4G and 5G entities are used for 5G communication are being considered.

As illustrated in FIG. 1, when the UE communicates with a network, certain deployment may be available, in which communication is controlled by using eNB and a 5G entity of a core network is used. In this case, mobility management between the UE and the AMF and session management between the UE and the SMF may be performed by a non access stratum (NAS) layer that is layer 3. Also, access stratum (AS) that is layer 2 may be transmitted between the UE and the eNB. Accordingly, there is a demand for a method of generating and managing security context for a case where the UE 101 accesses the 5G RAN 103.

It is assumed that a communication network system on which the present disclosure is based is 5G and 4G LTE networks, but the present disclosure may be applied to other systems with the same concept to the extent that one of ordinary skill in the art can understand.

In FIG. 1, an AAnF 181 and an AF 183 are entities used for communication with an application. The AAnf is an AKMA anchor function which manages a security key for an AKMA service. The AF is an application function which is an entity for providing an application service.

Here, AKMA represents authentication and key management for applications, and may provide an authentication and key management service for use of an application.

Also, A-KID represents AKMA key identifier which is an identifier used to identify $K_{AKMA}$ that is a security key. A-KID is NAI format in the form of username@realm and may be used to identify a UE or identify $K_{AKMA}$ that is a security key.

A-TID represents an AKMA temporary UE identifier which may include an identifier used in a UE to perform application communication.

Referring to FIG. 1, the UE and the AKMA anchor function (AAnF) communicate with the application function (AF). A $K_{AKMA}$ key that is a security key used by the UE and the AAnF is generated based on $K_{AUSF}$ used by the UE and the AUSF. $K_{AF}$ is a security key used by the UE and the AF. Also, $K_{AF}$ is the security key having an expiration time, and thus, when the expiration time is ended, the security key has to be updated. Accordingly, a process is requested, in which, when the expiration time of $K_{AF}$ is ended, $K_{AF}$ is updated. Therefore, when $K_{AF}$ is expired, $K_{AF}$ has to be updated. When $K_{AKMA}$ is updated, a $K_{AF}$ key used by the UE and the AF has to be also updated. When a $K_{AF}$ key that is a security key used by the UE and the AF is expired as an available time of the key is ended, although the $K_{AF}$ key is ended, $K_{AKMA}$ that generates the key is managed by the UE and the AUSF, and thus, there is a method for the UE and the AUSF to detect the expiry and update the key. In this regard, the present disclosure provides a method of triggering updating of a $K_{AKMA}$ key so as to update a $K_{AF}$ key, and updating the $K_{AF}$ key, based on the modified $K_{AKMA}$ key.

Figure 2:
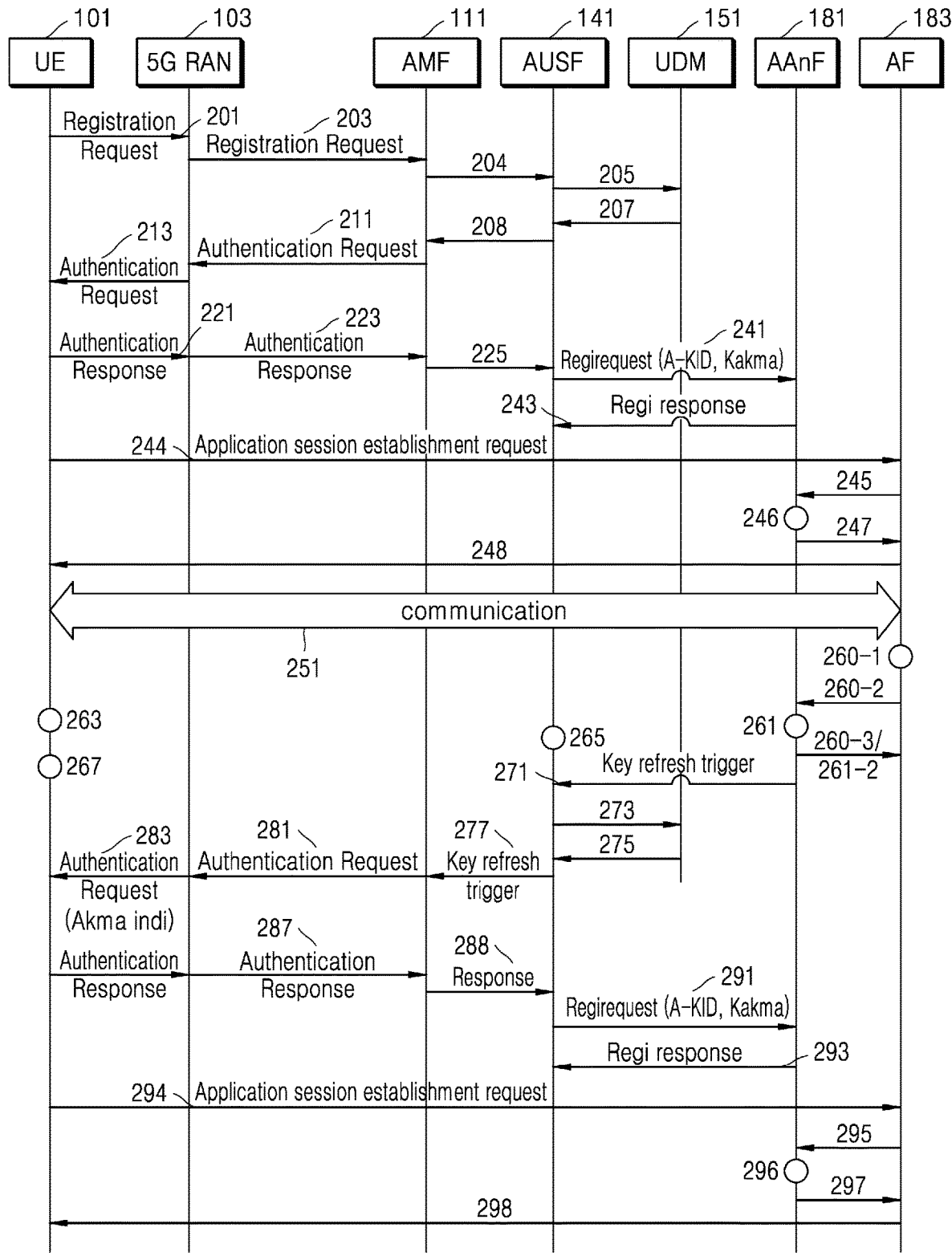
FIG. 2 illustrates a flowchart for describing a procedure for supporting security of an application in a 5G network, according to an embodiment of the present disclosure.

FIG. 2 illustrates a flowchart for describing a procedure for supporting security of an application in a 5G network, according to an embodiment of the present disclosure.

In operations 201 and 203, a UE transmits a REGISTRATION REQUEST message to an AMF.

In operation 204, the AMF transmits a UEAuthentication_authentication request message to an AUSF.

In operation 205, the AUSF transmits a UEAuthentication_authentication_get_request message to a UDM.

In operation 207, when the UDM receives the UEAuthentication_authentication_get_request message, the UDM generates an authentication vector. The UDM transmits an authentication_get_response message to the AUSF.

In operation 208, the AUSF transmits a UEAuthentication_authentication response message to the AMF.

In operations 211 and 213, the AMF transmits an AUTHENTICATION REQUEST message to the UE.

In operations 221 and 223, the UE transmits an AUTHENTICATION RESPONSE message to the AMF.

In operation 225, the AMF transmits a UEAuthentication_authentication request message to the AUSF.

In operation 241, the AUSF transmits an AnchorKey_Register request message to an AAnF. In this operation, A-KID that is an identifier for identifying the UE and a key, and $K_{AKMA}$ that is a seed of generating the key may be transmitted together.

In operation 243, the AAnF transmits an AnchorKey_Register response message to the AUSF.

In operation 244, the UE transmits an application session establishment request message to the application function.

In operation 245, the application function transmits a request message including A-KID and AF-ID so as to receive, by asking the AAnF, $K_{AF}$ used by the AF and the UE to communicate.

In operation 246, the AAnF derives $K_{AF}$ from $K_{AKMA}$.

In operation 247, the AAnF transmits information to the AF, the information being associated with $K_{AF}$ used by the AF to communicate with the UE and $K_{AF}$ exptime (i.e., an expiration time of $K_{AF}$).

In operation 248, the AF transmits an application session establishment response message to the UE.

In operation 251, the UE and the AAnF perform communication by executing an application.

In operation 260-1, a timer of AF security key $K_{AF}$ used by the AF to communicate with the UE is expired.

In this case, in an embodiment, the AF may operate as in 260-1, 260-2, and 260-3. That is, in 260-1, the AF may identify that the security key $K_{AF}$ is expired. As in 260-2, the AF may notify the AAnF that $K_{AF}$ is expired in the AF. A message indicating the expiration may simultaneously notify that it is requested to generate a new key and be transmitted from the AF to the AUSF such that key generation may be triggered. As in 260-3, the AAnF transmits a response message to the AF.

In another embodiment, as in operation 261, the AAnF may identify expiration of the security key $K_{AF}$. Therefore, in an embodiment, the AAnF may trigger necessity of generation of a security key to the AUSF. In this case, as in 261-2, the AAnF may notify the AF that the AAnF updates the security key $K_{AF}$.

In operation 263, a timer of AF security key $K_{AF}$ used by the UE to communicate with the AF is expired.

However, in operations 265 and 267, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 271, the AAnF may transmit a message for triggering key fresh so as to allow the AUSF to generate a $K_{AKMA}$ key and to generate a $K_{AF}$ key based on the generated new $K_{AKMA}$ key, by notifying the AUSF that the AF key $K_{AF}$ is expired. In an embodiment, a key refresh triggering message that is a new message for performing such function may be defined, and the AAnF may transmit the key refresh triggering message to the AUSF.

In operation 271, when the AUSF receives the key refresh triggering message from the AAnF, the AUSF may notify that from an upper layer to layer 3 that a new $K_{AKMA}$ key has to be updated. When the request for dating the $K_{AKMA}$ key is transmitted from the upper layer, i.e., the application layer, to layer 3, layer 3 of the AUSF generates new $K_{AKMA}$.

In another embodiment, when the AUSF receives the key refresh trigger message of operation 271, as in operations 273 and 275, the AUSF transmits an authentication_get_request message to the UDM, and the AUSF generates new $K_{AKMA}$ when the AUSF receives AKMA indication by receiving an authentication_get_response message from the UDM. In another example, when the AUSF receives AKMA refresh indication, the AUSF generates new $K_{AKMA}$.

In operation 273, the AUSF transmits an authentication_get_request message to the UDM.

In operation 277, the AUSF may transmit a key refresh triggering message to the AMF so as to refresh a $K_{AKMA}$ key of the UE.

Alternatively, in another embodiment, in operation 277, the AUSF transmits a UEAuthentication_authentication response message to the AMF. In this case, the authentication response message may perform key refresh triggering so as to refresh the $K_{AKMA}$ key.

In operations 281 and 283, the AMF may transmit an AUTHENTICATION REQUEST message to the UE.

The authentication request message used in operations 281 and 283 may perform key refresh triggering so as to refresh the $K_{AKMA}$ key of the UE.

Therefore, a form of the message is as in Table 1. Referring to Table 1, a $K_{AKMA}$ key refresh indication information element indicating necessity of refreshing of the $K_{AKMA}$ key is included in the message, and thus, the necessity of $K_{AKMA}$ key refresh may be indicated. Also, the message may include an AKMA indication information element. When the UE is a terminal enabled for an AKMA service and a subscription of the UE is enabled for the AKMA service, the AKMA indication information element may be used to notify the UE that the corresponding service is available. Also, the AKMA indication information element may be used together with the $K_{AKMA}$ key refresh indication, thereby indicating the necessity of <<img3>> key refresh.

As the UE receives the authentication request message, the UE updates $K_{AUSF}$ and $K_{AMF}$.

Also, when the UE receives the AKMA indication information element or the $K_{AKMA}$ key refresh indication via the authentication request message, the UE updates $K_{AKMA}$ key and $K_{AF}$ key.

TABLE 1

| | AUTHENTICATION REQUEST | | | | |
|---|---|---|---|---|---|
| IEI | Information Element | Type/Reference | Presence | Format | Length |
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | ABBA | ABBA | M | LV | 3-n |
| | Authentication parameter RAND (5G authentication challenge) | Authentication parameter RAND | O | TV | 17 |
| | Authentication parameter AUTN (5G authentication challenge) | Authentication parameter AUTN | O | TLV | 18 |
| | EAP message AKMA indication $K_{AKMA}$ refresh indication | EAP message | O | TLV-E | 7-1503 |

In operation 275, when the UDM receives the authentication_get_request message, the UDM generates an authentication vector. The UDM transmits an authentication_get_response message to the AUSF.

In an embodiment, a process of triggering operation 277 in operation 271 may correspond to a process in which the upper layer of the AUSF, i.e., the application layer, transmits a notice to a layer corresponding to layer 3, thereby triggering the process.

In another embodiment, a process of triggering operation 273 and 277 in operation 271 may correspond to
a process in which the upper layer of the AUSF, i.e., the application layer, transmits a notice to a layer corresponding to layer 3, thereby triggering the process.

In operations 285 and 287, the UE may transmit an AUTHENTICATION RESPONSE message to the AMF.

In operation 288, the AMF transmits a UEAuthentication_authentication request message to the AUSF.

In operation 291, the AUSF transmits an AnchorKey_Register request message to the AAnF. In this operation, A-KID that is an identifier for identifying the UE and a key and $K_{AKMA}$ that is a seed of key generation may be transmitted together.

In operation 293, the AAnF transmits an AnchorKey_Register response message to the AUSF.

In operation 294, the UE transmits an application session establishment request message to the application function.

In operation 295, the application function transmits a request message including A-KID and AF-ID so as to receive, by asking the AAnF, $K_{AF}$ used by the AF and the UE to communicate.

In operation 296, the AAnF derives $K_{AF}$ from $K_{AKMA}$.

In operation 297, the AAnF transmits information to the AF, the information being associated with $K_{AF}$ used by the AF to communicate with the UE and $K_{AF}$ exptime (i.e., an expiration time of $K_{AF}$).

In operation 298, the AF transmits an application session establishment response message to the UE.

Figure 3:
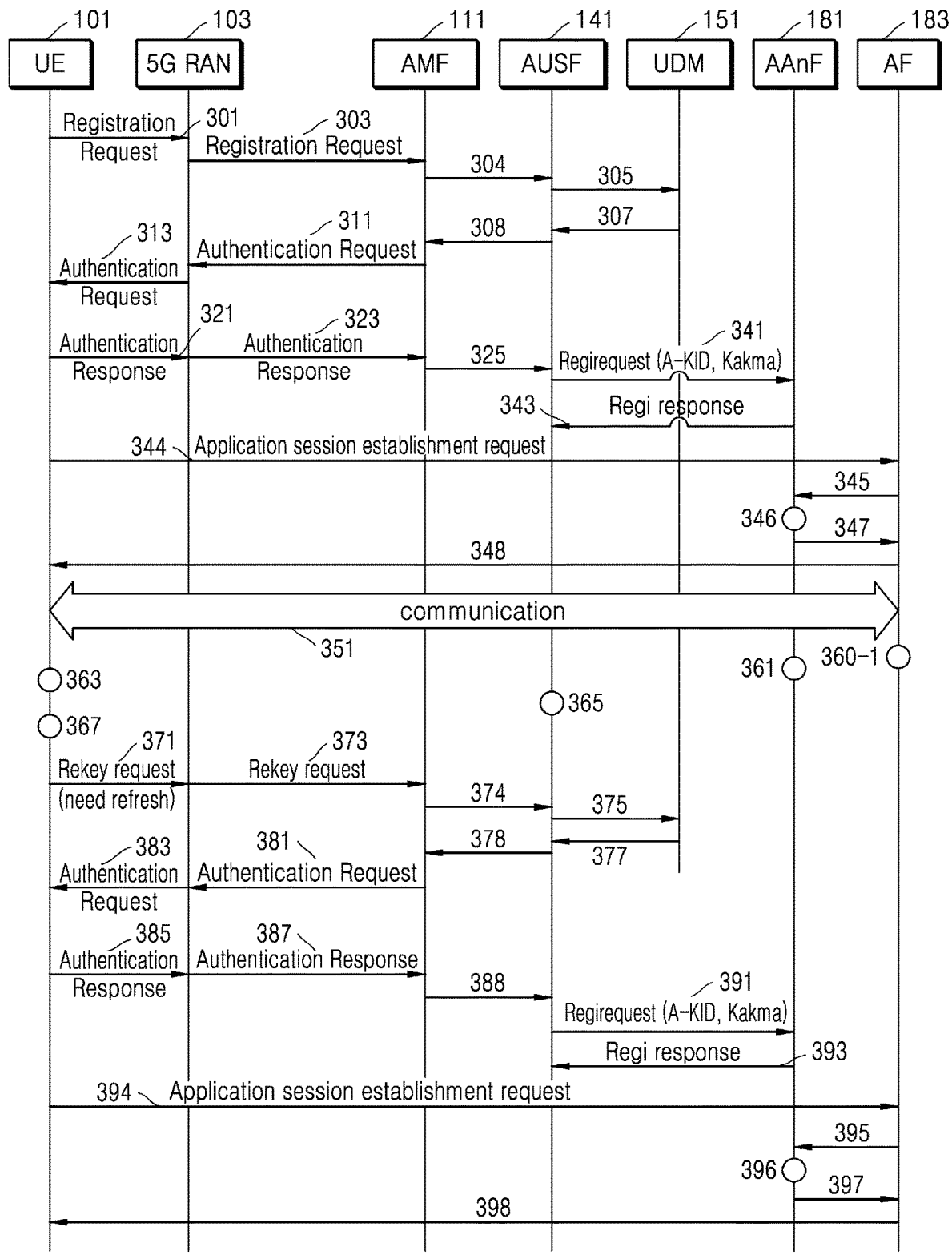
FIG. 3 illustrates a flowchart for describing a procedure for supporting security of an application in a 5G network, according to an embodiment of the present disclosure.

FIG. 3 illustrates a flowchart for describing a procedure for supporting security of an application in a 5G network, according to an embodiment of the present disclosure.

An embodiment of the present disclosure relates to a procedure for supporting security of an application via a UE-based triggering method.

In operations 301 and 303, a UE transmits a REGISTRATION REQUEST message to an AMF.

In operation 304, the AMF transmits a UEAuthentication_authentication request message to an AUSF.

In operation 305, the AUSF transmits a UEAuthentication_authentication_get_request message to a UDM.

In operation 307, when the UDM receives the UEAuthentication_authentication_get_request message, the UDM generates an authentication vector. The UDM transmits an authentication_get_response message to the AUSF.

In operation 308, the AUSF transmits a UEAuthentication_authentication response message to the AMF.

In operations 311 and 313, the AMF transmits an AUTHENTICATION REQUEST message to the UE.

In operations 321 and 323, the UE transmits an AUTHENTICATION RESPONSE message to the AMF.

In operation 325, the AMF transmits a UEAuthentication_authentication request message to the AUSF.

In operation 341, the AUSF transmits an AnchorKey_Register request message to an AAnF. In this operation, A-KID that is an identifier for identifying the UE and a key, and $K_{AKMA}$ that is a seed of generating the key may be transmitted together.

In operation 343, the AAnF transmits an AnchorKey_Register response message to the AUSF.

In operation 344, the UE transmits an application session establishment request message to the application function.

In operation 345, the application function transmits a request message including A-KID and AF-ID so as to receive, by asking the AAnF, $K_{AF}$ used by the AF and the UE to communicate.

In operation 346, the AAnF derives $K_{AF}$ from $K_{AKMA}$.

In operation 347, the AAnF transmits information to the AF, the information being associated with $K_{AF}$ used by the AF to communicate with the UE and $K_{AF}$ exptime (i.e., an expiration time of $K_{AF}$).

In operation 348, the AF transmits an application session establishment response message to the UE. In operation 351, the UE and the AAnF perform communication by executing an application.

In operation 360-1, a timer of AF security key $K_{AF}$ used by the AF to communicate with the UE is expired.

That is, in 360-1, the AF may identify that the security key $K_{AF}$ is expired.

In another embodiment, as in operation 361, the AAnF may identify expiration of the security key $K_{AF}$.

In operation 363, a timer of AF security key $K_{AF}$ used by the UE to communicate with the AF is expired.

However, in operations 365 and 367, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 371, the UE may transmit a rekey request message to the AMF to refresh an AF-associated key.

Here, as a security key $K_{AF}$ used by the AF is expired in the UE, as illustrated in FIG. 1, the application layer of the UE, i.t., the upper layer, may notify the NAS layer that $K_{AKMA}$ that is a master key has to be updated to generate a new key.

Afterward, in operations 371 and 373, the UE may perform triggering on the AMF to newly perform an authentication process so as to refresh the AF-associated key.

In this triggering, as in operations 371 and 373, a new message may be defined and used in an embodiment. The new message may be the rekey request message.

In an embodiment, the new rekey request message used therefor may include identity information such as SUCI, 5G-GUTI, or the like. Also, as the rekey request message is a message for triggering an authentication request message due to expiration of an application security key $K_{AF}$, the rekey request message may include indication or associated information indicating that there is a need to renew authentication. Therefore, a form of the message of 371 and 373 is as in Table 2. Referring to Table 2, a $K_{AKMA}$ key refresh indication information element indicating necessity of refreshing of the $K_{AKMA}$ key is included in the message, and thus, the necessity of $K_{AKMA}$ key refresh may be indicated. Also, the message may include an AKMA indication information element. When the UE is a terminal enabled for an AKMA service and a subscription of the UE is enabled for the AKMA service, the AKMA indication information element may be used to notify a network that the corresponding service is available.

Also, the AKMA indication information element may be used together with the $K_{AKMA}$ key refresh indication, thereby indicating the necessity of <<img3>> key refresh.

As the AMF receives the rekey request message, the AMF may perform triggering of authentication on the AUSF as in 374, 375, 377, and 378. That is, the AMF transmits a UEAuthentication_authentication request message to the AUSF.

When the AUSF receives the UEAuthentication_authentication request message, the AUSF updates $K_{AUSF}$ $K_{AMF}$.

Also, when the UE receives the AKMA indication information element or the $K_{AKMA}$ key refresh indication in the authentication request message, the UE updates $K_{AKMA}$ key and $K_{AF}$ key.

In another embodiment, cause or authentication request indication may be included. The authentication request indication may be used as a notice to indicate triggering of primary authentication, upon reception of the message. That is, when the AMF receives the message, the AMF may transmit the UEAuthentication_authentication request message to the AUSF so as to trigger primary authentication.

Alternatively, it may be notified, by including a cause information element in the message, that a primary authentication procedure is triggered as the application security key $K_{AF}$ is expired.

TABLE 2

Rekey REQUEST message

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Rekey Rrequest message identity | Message type | M | V | 1 |
| | ngKSI | NAS key set identifier | M | V | ½ |
| | 5GS mobile identity | 5GS mobile identity 9.11.3.4 | M | LV-E | 6-n |
| | AKMA indication | | O | | |
| | AKMA refresh indication | | O | | |
| | Cause | | | | |
| | Authentication request indi | | | | |

That is, the AMF receives a registration request from the UE in operations 371 and 373. The registration request triggers the AMF to transmit, to the AUSF, the UEAuthentication_authentication request for the AUSF to update $K_{AKMA}$.

In operation 374, the AMF transmits a UEAuthentication_authentication request message to the AUSF.

In operation 375, the AUSF transmits a UEAuthentication_authentication_get_request message to the UDM.

In operation 377, when the UDM receives the UEAuthentication_authentication_get_request message, the UDM generates an authentication vector. The UDM transmits an authentication_get_response message to the AUSF.

In operation 378, the AUSF transmits a UEAuthentication_authentication response message to the AMF.

Afterward, in operations 381 and 383, the AMF may transmit an authentication request message to the UE.

Therefore, a form of the message is as in Table 3. Referring to Table 3, a $K_{AKMA}$ key refresh-sync indication information element indicating necessity of refreshing of the $K_{AKMA}$ key is included, and thus, $K_{AKMA}$ key refresh completion by the AUSF may be indicated. Also, the message may include an AKMA indication information element.

When the UE is a terminal enabled for an AKMA service and a subscription of the UE is enabled for the AKMA service, the AKMA indication information element may be used to notify the UE that the corresponding service is available. In another embodiment, the AKMA indication information element may be used to notify that update is also requested for the UE when update of a $K_{AKMA}$ key is performed in a network. Also, the AKMA indication information element and the $K_{AKMA}$ refresh-sync indication may be used together to indicate that $K_{AKMA}$ key refresh is completed.

When the UE receives the authentication request message, the UE may update $K_{AUSF}$ and $K_{AMF}$.

Also, when the UE receives the AKMA indication information element or the $K_{AKMA}$ key refresh indication via the authentication request message, the UE updates $K_{AKMA}$ key and $K_{AF}$ key.

TABLE 3

AUTHENTICATION REQUEST

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | ABBA | ABBA | M | LV | 3-n |
| | Authentication parameter RAND (5G authentication challenge) | Authentication parameter RAND | O | TV | 17 |
| | Authentication parameter AUTN (5G authentication challenge) | Authentication parameter AUTN | O | TLV | 18 |
| | EAP message | EAP message | O | TLV-E | 7-1503 |
| | AKMA indication | | | | |
| | $K_{AKMA}$ refresh sync indication | | | | |

In operations 385 and 387, the UE may transmit an AUTHENTICATION RESPONSE message to the AMF.

In operation 388, the AMF transmits a UEAuthentication_authentication request message to the AUSF.

In operation 391, the AUSF transmits an AnchorKey_Register request message to the AAnF. In this operation, A-KID that is an identifier for identifying the UE and a key and $K_{AKMA}$ that is a seed of key generation may be transmitted together.

In operation 393, the AAnF transmits an AnchorKey_Register response message to the AUSF.

In operation 394, the UE transmits an application session establishment request message to the application function.

In operation 395, the application function transmits a request message including A-KID and AF-ID so as to receive, by asking the AAnF, $K_{AF}$ used by the AF and the UE to communicate.

In operation 396, the AAnF derives $K_{AF}$ from $K_{AKMA}$.

In operation 397, the AAnF transmits information to the AF, the information being associated with $K_{AF}$ used by the AF to communicate with the UE and $K_{AF}$ exptime (i.e., an expiration time of $K_{AF}$).

In operation 398, the AF transmits an application session establishment response message to the UE.

Figure 4:
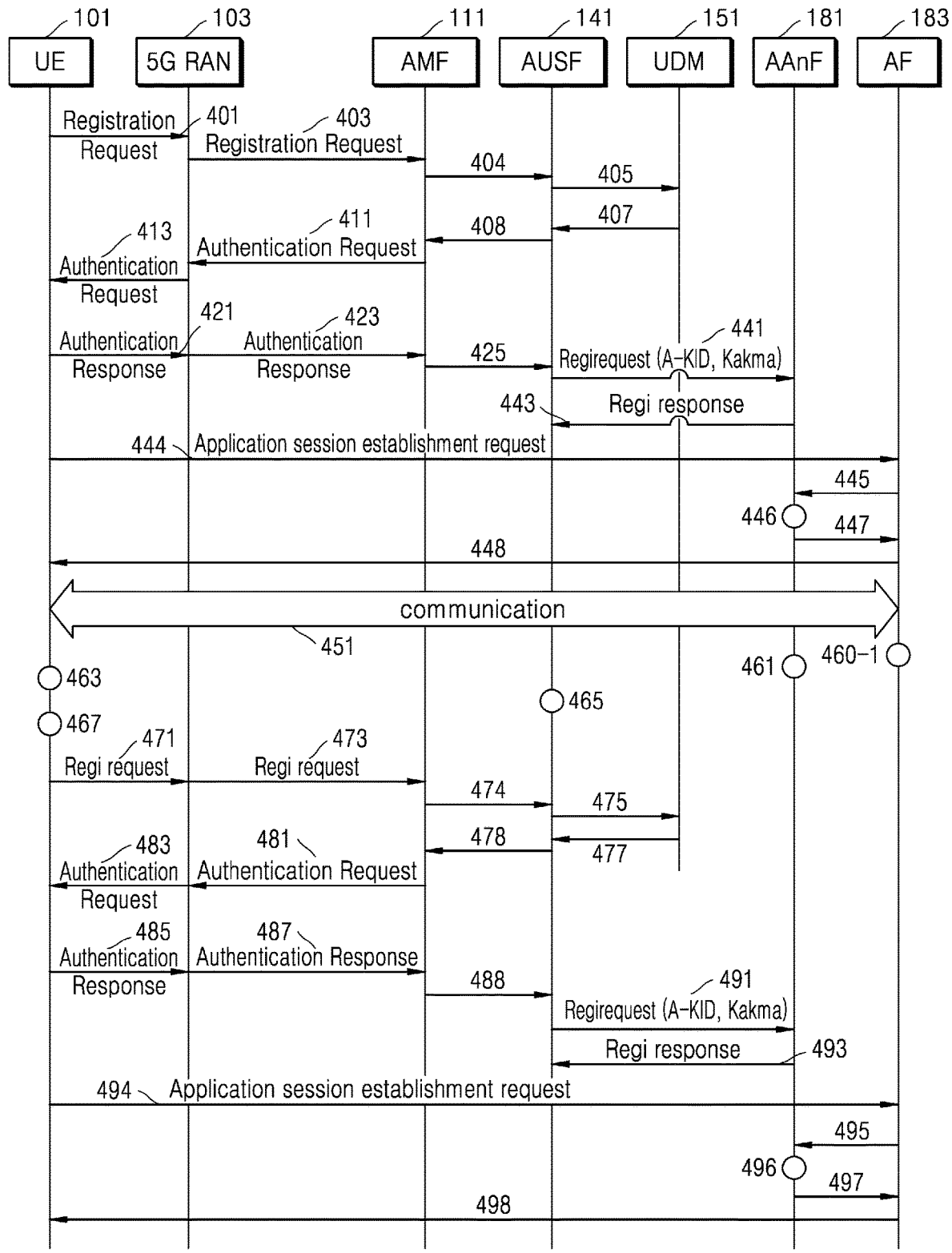
FIG. 4 illustrates a flowchart for describing a procedure for supporting security of an application in a 5G network, according to an embodiment of the present disclosure.

FIG. 4 illustrates a flowchart for describing a procedure for supporting security of an application in a 5G network, according to an embodiment of the present disclosure.

An embodiment of the present disclosure relates to a UE-based triggering method using a registration request message so as to support security of an application. In operations 401 and 403, a UE transmits a REGISTRATION REQUEST message to an AMF.

In operation 404, the AMF transmits a UEAuthentication_authentication request message to an AUSF.

In operation 405, the AUSF transmits a UEAuthentication_authentication_get_request message to a UDM.

In operation 407, when the UDM receives the UEAuthentication_authentication_get_request message, the UDM generates an authentication vector. The UDM transmits an authentication_get_response message to the AUSF.

In operation 408, the AUSF transmits a UEAuthentication_authentication response message to the AMF.

In operations 411 and 413, the AMF transmits an AUTHENTICATION REQUEST message to the UE.

In operations 421 and 423, the UE transmits an AUTHENTICATION RESPONSE message to the AMF.

In operation 425, the AMF transmits a UEAuthentication_authentication request message to the AUSF.

In operation 441, the AUSF transmits an AnchorKey_Register request message to an AAnF. In this operation, A-KID that is an identifier for identifying the UE and a key, and $K_{AKMA}$ that is a seed of generating the key may be transmitted together.

In operation 443, the AAnF transmits an AnchorKey_Register response message to the AUSF.

In operation 444, the UE transmits an application session establishment request message to the application function.

In operation 445, the application function transmits a request message including A-KID and AF-ID so as to receive, by asking the AAnF, $K_{AF}$ used by the AF and the UE to communicate.

In operation 446, the AAnF derives $K_{AF}$ from $K_{AKMA}$.

In operation 447, the AAnF transmits information to the AF, the information being associated with $K_{AF}$ used by the AF to communicate with the UE and $K_{AF}$ exptime (i.e., an expiration time of $K_{AF}$).

In operation 448, the AF transmits an application session establishment response message to the UE. In operation 451, the UE and the AAnF perform communication by executing an application.

In operation 460-1, a timer of AF security key $K_{AF}$ used by the AF to communicate with the UE is expired.

That is, in 460-1, the AF may identify that the security key $K_{AF}$ is expired. In another embodiment, as in operation 461, the AAnF may identify expiration of the security key $K_{AF}$.

In operation 463, a timer of AF security key $K_{AF}$ used by the UE to communicate with the AF is expired.

However, in operations 465 and 467, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 471, the UE may transmit a rekey request message to the AMF to refresh an AF-associated key.

Here, as a security key $K_{AF}$ used by the AF is expired in the UE, as illustrated in FIG. 1, the application layer of the UE, i.t., the upper layer, may notify the NAS layer that $K_{AKMA}$ that is a master key has to be updated to generate a new key.

Afterward, in operations 471 and 473, the UE may perform triggering on the AMF to newly perform an authentication process so as to refresh the AF-associated key.

In this triggering, as in operations 471 and 473, a registration request message may be used in an embodiment.

In an embodiment, the registration request message used therefor may include identity information such as SUCI, 5G-GUTI, or the like. Also, as the registration request message is a message for triggering an authentication request message due to expiration of an application security key $K_{AF}$, the registration request message may include indication or associated information indicating that there is a need to renew authentication.

That is, the AMF receives a registration request from the UE in operations 471 and 473. The registration request triggers the AMF to transmit, to the AUSF, the UEAuthentication_authentication request for the AUSF to update $K_{AKMA}$.

Therefore, a form of the message of 471 and 473 is as in Table 4. Referring to Table 4, a $K_{AKMA}$ key refresh indication information element indicating necessity of refreshing of the $K_{AKMA}$ key is included in the message, and thus, the necessity of KAKMA key refresh may be indicated. Also, the message may include an AKMA indication information element. When the UE is a terminal enabled for an AKMA service and a subscription of the UE is enabled for the AKMA service, the AKMA indication information element may be used to notify a network that the corresponding service is available.

Also, the AKMA indication information element may be used together with the $K_{AKMA}$ key refresh indication, thereby indicating the necessity of <<img3>> key refresh.

As the AMF receives the rekey request message, the AMF may perform triggering of authentication on the AUSF as in 474, 475, 477, and 478. That is, the AMF transmits a UEAuthentication_authentication request message to the AUSF.

When the AUSF receives the UEAuthentication_authentication request message, the AUSF updates $K_{AUSF}$ $K_{AMF}$.

Also, when the UE receives the AKMA indication information element or the $K_{AKMA}$ key refresh indication included in the authentication request message, the UE updates $K_{AKMA}$ key and $K_{AF}$ key.

In another embodiment, cause or authentication request indication may be included. The authentication request indication may be used as a notice to indicate triggering of primary authentication, upon reception of the message. That is, when the AMF receives the message, the AMF may transmit the UEAuthentication_authentication request message to the AUSF so as to trigger primary authentication.

Alternatively, it may be notified, by including a cause information element in the message, that a primary authentication procedure is triggered as the application security key $K_{AF}$ is expired.

TABLE 4 registration REQUEST message

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Registration request message identity | Message type | M | V | 1 |
| | 5GS registration type | | | | |
| | ngKSI | NAS key set identifier | M | V | ½ |
| | 5GS mobile identity | 5GS mobile identity 9.11.3.4 | M | LV-E | 6-n |
| | AKMA indication | | O | | |
| | AKMA refresh indication | | O | | |
| | Cause | | | | |
| | Authentication request indi | | | | |

In operation 474, the AMF transmits a UEAuthentication_authentication request message to the AUSF.

In operation 475, the AUSF transmits a UEAuthentication_authentication_get_request message to the UDM.

In operation 477, when the UDM receives the UEAuthentication_authentication_get_request message, the UDM generates an authentication vector. The UDM transmits an authentication_get_response message to the AUSF.

In operation 478, the AUSF transmits a UEAuthentication_authentication response message to the AMF.

Afterward, in operations 481 and 483, the AMF may transmit an authentication request message to the UE.

Therefore, a form of the message is as in Table 5. Referring to Table 5, a $K_{AKMA}$ key refresh-sync indication information element indicating necessity of refreshing of the $K_{AKMA}$ key is included in the message, and thus, $K_{AKMA}$ key refresh completion by the AUSF may be indicated. Also, the message may include an AKMA indication information element.

When the UE is a terminal enabled for an AKMA service and a subscription of the UE is enabled for the AKMA service, the AKMA indication information element may be used to notify the UE that the corresponding service is available. In another embodiment, the AKMA indication information element may be used to notify that update is also requested for the UE when update of AKMA key $K_{AKMA}$ key is performed in a network. Also, the AKMA indication information element and the $K_{AKMA}$ key refresh-sync indication may be used together to indicate that $K_{AKMA}$ key refresh is completed.

When the UE receives the authentication request message, the UE updates $K_{AUSF}$ and $K_{AMF}$.

Also, when the UE receives the AKMA indication information element or the $K_{AKMA}$ key refresh indication included in the authentication request message, the UE updates $K_{AKMA}$ key and $K_{AF}$ key.

TABLE 5

AUTHENTICATION REQUEST

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | ABBA | ABBA | M | LV | 3-n |
| | Authentication parameter RAND (5G authentication challenge) | Authentication parameter RAND | O | TV | 17 |
| | Authentication parameter AUTN (5G authentication challenge) | Authentication parameter AUTN | O | TLV | 18 |
| | EAP message | EAP message | O | TLV-E | 7-1503 |
| | AKMA indication | | | | |
| | $K_{AKMA}$ refresh sync indication | | | | |

In operations 485 and 487, the UE may transmit an AUTHENTICATION RESPONSE message to the AMF.

In operation 488, the AMF transmits a UEAuthentication_authentication request message to the AUSF.

In operation 491, the AUSF transmits an AnchorKey_Register request message to the AAnF. In this operation, A-KID that is an identifier for identifying the UE and a key and $K_{AKMA}$ that is a seed of key generation may be transmitted together.

In operation 493, the AAnF transmits an AnchorKey_Register response message to the AUSF.

In operation 494, the UE transmits an application session establishment request message to the application function.

In operation 495, the application function transmits a request message including A-KID and AF-ID so as to receive, by asking the AAnF, $K_{AF}$ used by the AF and the UE to communicate.

In operation 496, the AAnF derives $K_{AF}$ from $K_{AKMA}$.

In operation 497, the AAnF transmits information to the AF, the information being associated with $K_{AF}$ used by the AF to communicate with the UE and $K_{AF}$ exptime, i.e., an expiration time of $K_{AF}$.

In operation 498, the AF transmits an application session establishment response message to the UE.

Figure 5:
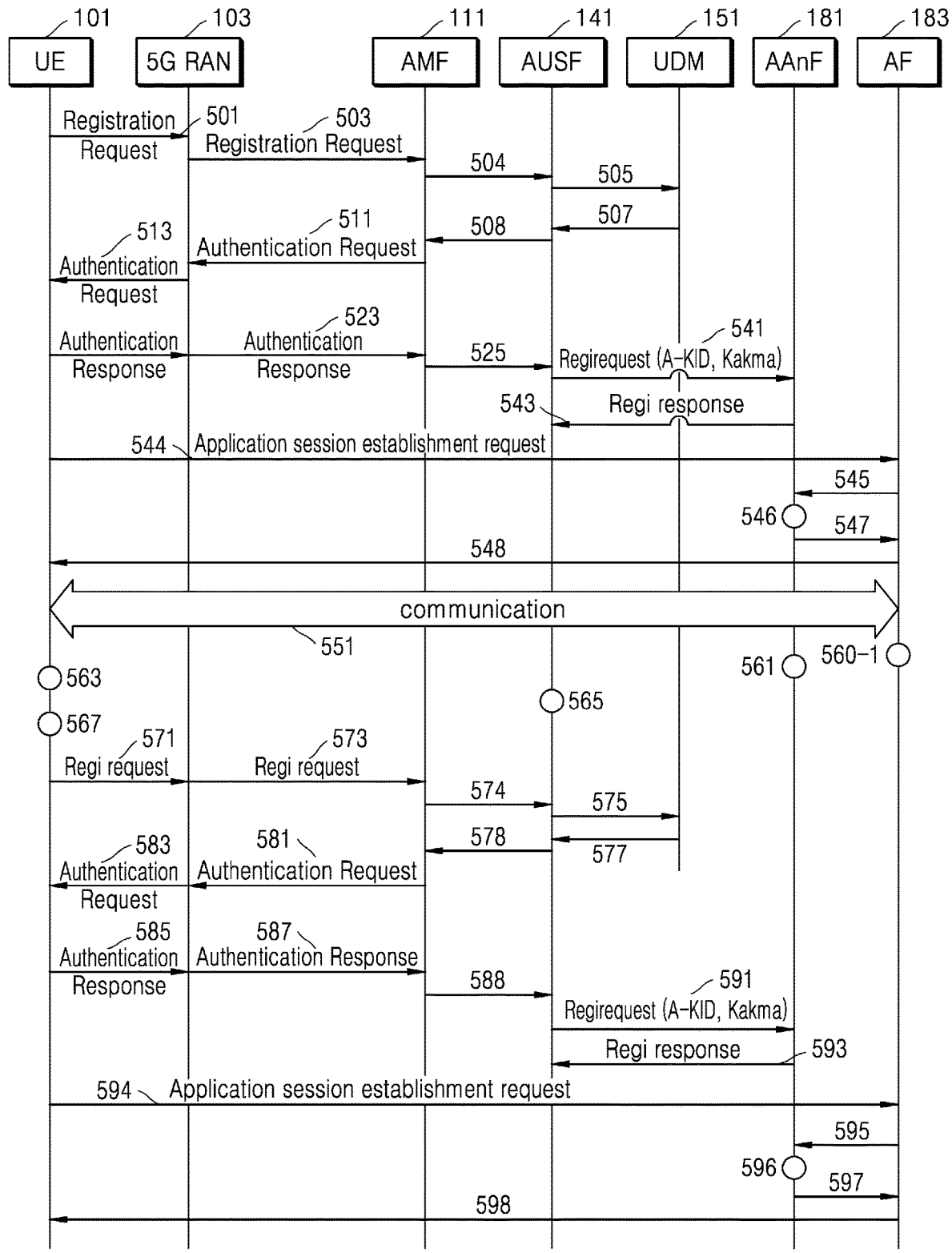
FIG. 5 illustrates a flowchart for describing a procedure for supporting security of an application in a 5G network, according to an embodiment of the present disclosure.

FIG. 5 illustrates a flowchart for describing a procedure for supporting security of an application in a 5G network, according to an embodiment of the present disclosure.

An embodiment of the present disclosure relates to a UE-based triggering method using a registration request message so as to support security of an application.

In operations 501 and 503, a UE transmits a REGISTRATION REQUEST message to an AMF.

In operation 504, the AMF transmits a UEAuthentication_authentication request message to an AUSF.

In operation 505, the AUSF transmits a UEAuthentication_authentication_get_request message to a UDM.

In operation 507, when the UDM receives the UEAuthentication_authentication_get_request message, the UDM generates an authentication vector. The UDM transmits an authentication_get_response message to the AUSF.

In operation 508, the AUSF transmits a UEAuthentication_authentication response message to the AMF.

In operations 511 and 513, the AMF transmits an AUTHENTICATION REQUEST message to the UE.

In operations 521 and 523, the UE transmits an AUTHENTICATION RESPONSE message to the AMF.

In operation 525, the AMF transmits a UEAuthentication_authentication request message to the AUSF.

In operation 541, the AUSF transmits an AnchorKey_Register request message to an AAnF. In this operation, A-KID that is an identifier for identifying the UE and a key, and $K_{AKMA}$ that is a seed of generating the key may be transmitted together.

In operation 543, the AAnF transmits an AnchorKey_Register response message to the AUSF.

In operation 544, the UE transmits an application session establishment request message to the application function.

In operation 545, the application function transmits a request message including A-KID and AF-ID so as to receive, by asking the AAnF, $K_{AF}$ used by the AF and the UE to communicate.

In operation 546, the AAnF derives $K_{AF}$ from $K_{AKMA}$.

In operation 547, the AAnF transmits information to the AF, the information being associated with $K_{AF}$ used by the AF to communicate with the UE and $K_{AF}$ exptime (i.e., an expiration time of $K_{AF}$).

In operation 548, the AF transmits an application session establishment response message to the UE. In operation 551, the UE and the AAnF perform communication by executing an application.

In operation 560-1, a timer of AF security key $K_{AF}$ used by the AF to communicate with the UE is expired.

That is, in 560-1, the AF may identify that the security key $K_{AF}$ is expired. In another embodiment, as in operation 561, the AAnF may identify expiration of the security key $K_{AF}$.

In operation 563, a timer of AF security key $K_{AF}$ used by the UE to communicate with the AF is expired.

However, in operations 565 and 567, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 571, the UE may transmit a rekey request message to the AMF to refresh an AF-associated key.

Here, as a security key $K_{AF}$ used by the AF is expired in the UE, as illustrated in FIG. 1, the application layer of the UE, i.t., the upper layer, may notify the NAS layer that $K_{AKMA}$ that is a master key has to be updated to generate a new key.

Afterward, in operations 571 and 573, the UE may perform triggering on the AMF to newly perform an authentication process so as to refresh the AF-associated key.

In this triggering, as in operations 571 and 573, a registration request message may be used in an embodiment.

In an embodiment, the registration request message used therefor may include identity information such as SUCI, 5G-GUTI, or the like.

Also, the registration request message is a message being periodically transmitted, and thus, may include information indicating that application security key $K_{AF}$-associated information is expired. Alternatively, as the registration request message is a message for triggering an authentication request message due to expiration of an application security key $K_{AF}$, the registration request message may include indication or associated information indicating that there is a need to renew authentication.

That is, the AMF receives a registration request from the UE in operations 571 and 573. The registration request triggers the AMF to transmit, to the AUSF, the UEAuthentication_authentication request for the AUSF to update $K_{AKMA}$.

Therefore, a form of the message of 571 and 573 is as in Table 6. Referring to Table 6, a $K_{AKMA}$ key refresh indication information element indicating necessity of refreshing of the KAKMA key is included in the message, and thus, the necessity of $K_{AKMA}$ key refresh may be indicated. Also, the message may include an AKMA indication information element. When the UE is a terminal enabled for an AKMA service and a subscription of the UE is enabled for the AKMA service, the AKMA indication information element may be used to notify a network that the corresponding service is available.

Also, the AKMA indication information element may be used together with the $K_{AKMA}$ key refresh indication, thereby indicating the necessity of <<img3>> key refresh.

As the AMF receives the rekey request message, the AMF may perform triggering of authentication on the AUSF as in 574, 575, 577, and 578. That is, the AMF transmits a UEAuthentication_authentication request message to the AUSF.

When the AUSF receives the UEAuthentication_authentication request message, the AUSF updates $K_{AUSF}$ $K_{AMF}$.

Also, when the UE receives the AKMA indication information element or the $K_{AKMA}$ key refresh indication in the authentication request message, the UE updates $K_{AKMA}$ key and $K_{AF}$ key.

In another embodiment, cause or authentication request indication may be included. The authentication request indication may be used as a notice to indicate triggering of primary authentication, upon reception of the message. That is, when the AMF receives the message, the AMF may transmit the UEAuthentication_authentication request message to the AUSF so as to trigger primary authentication.

Alternatively, it may be notified, by including a cause information element in the message, that a primary authentication procedure is triggered as the application security key $K_{AF}$ is expired.

TABLE 6 registration REQUEST message

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Registration request message id entity | Message type | M | V | 1 |
| | 5GS registration type | | | | |
| | ngKSI | NAS key set identifier | M | V | ½ |
| | 5GS mobile identity | 5GS mobile identity 9.11.3.4 | M | LV-E | 6-n |
| | AKMA indication | | O | | |
| | AKMA refresh indication | | O | | |
| | Cause | | | | |
| | Authentication request indi | | | | |

In operation 574, the AMF transmits a UEAuthentication_authentication request message to the AUSF.

In operation 575, the AUSF transmits a UEAuthentication_authentication_get_request message to the UDM.

In operation 577, when the UDM receives the UEAuthentication_authentication_get_request message, the UDM generates an authentication vector. The UDM transmits an authentication_get_response message to the AUSF.

In operation 578, the AUSF transmits a UEAuthentication_authentication response message to the AMF.

is performed in a network. Also, the AKMA indication information element and the $K_{AKMA}$ key refresh-sync indication may be used together to indicate that $K_{AKMA}$ key refresh is completed.

When the UE receives the authentication request message, the UE updates $K_{AUSF}$ and $K_{AMF}$.

Also, when the UE receives the AKMA indication information element or the $K_{AKMA}$ key refresh indication included in the authentication request message, the UE updates $K_{AKMA}$ key and $K_{AF}$ key.

TABLE 7

AUTHENTICATION REQUEST

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | ABBA | ABBA | M | LV | 3-n |
| | Authentication parameter RAND (5G authentication challenge) | Authentication parameter RAND | O | TV | 17 |
| | Authentication parameter AUTN (5G authentication challenge) | Authentication parameter AUTN | O | TLV | 18 |
| | EAP message | EAP message | O | TLV-E | 7-1503 |
| | AKMA indication | | | | |
| | $K_{AKMA}$ refresh sync indication | | | | |

Afterward, in operations 581 and 583, the AMF may transmit an authentication request message to the UE.

In operations 581 and 583, the AMF may transmit an AUTHENTICATION REQUEST message to the UE.

Therefore, a form of the message is as in Table 7. Referring to Table 7, a $K_{AKMA}$ key refresh-sync indication information element indicating necessity of refreshing of the $K_{AKMA}$ key is included in the message, and thus, $K_{AKMA}$ key refresh completion by the AUSF may be indicated. Also, the message may include an AKMA indication information element.

When the UE is a terminal enabled for an AKMA service and a subscription of the UE is enabled for the AKMA service, the AKMA indication information element may be used to notify the UE that the corresponding service is available. In another embodiment, the AKMA indication information element may be used to notify that update is also requested for the UE when update of AKMA key $K_{AKMA}$ key In operations 585 and 587, the UE may transmit an AUTHENTICATION RESPONSE message to the AMF.

In operation 588, the AMF transmits a UEAuthentication_authentication request message to the AUSF.

In operation 591, the AUSF transmits an AnchorKey_Register request message to the AAnF. In this operation, A-KID that is an identifier for identifying the UE and a key and $K_{AKMA}$ that is a seed of key generation may be transmitted together.

In operation 593, the AAnF transmits an AnchorKey_Register response message to the AUSF.

In operation 594, the UE transmits an application session establishment request message to the application function.

In operation 595, the application function transmits a request message including A-KID and AF-ID so as to receive, by asking the AAnF, $K_{AF}$ used by the AF and the UE to communicate.

In operation 596, the AAnF derives $K_{AF}$ from $K_{AKMA}$.

In operation 597, the AAnF transmits information to the AF, the information being associated with $K_{AF}$ used by the AF to communicate with the UE and $K_{AF}$ exptime (i.e., an expiration time of $K_{AF}$).

In operation 598, the AF transmits an application session establishment response message to the UE.

Figure 6:
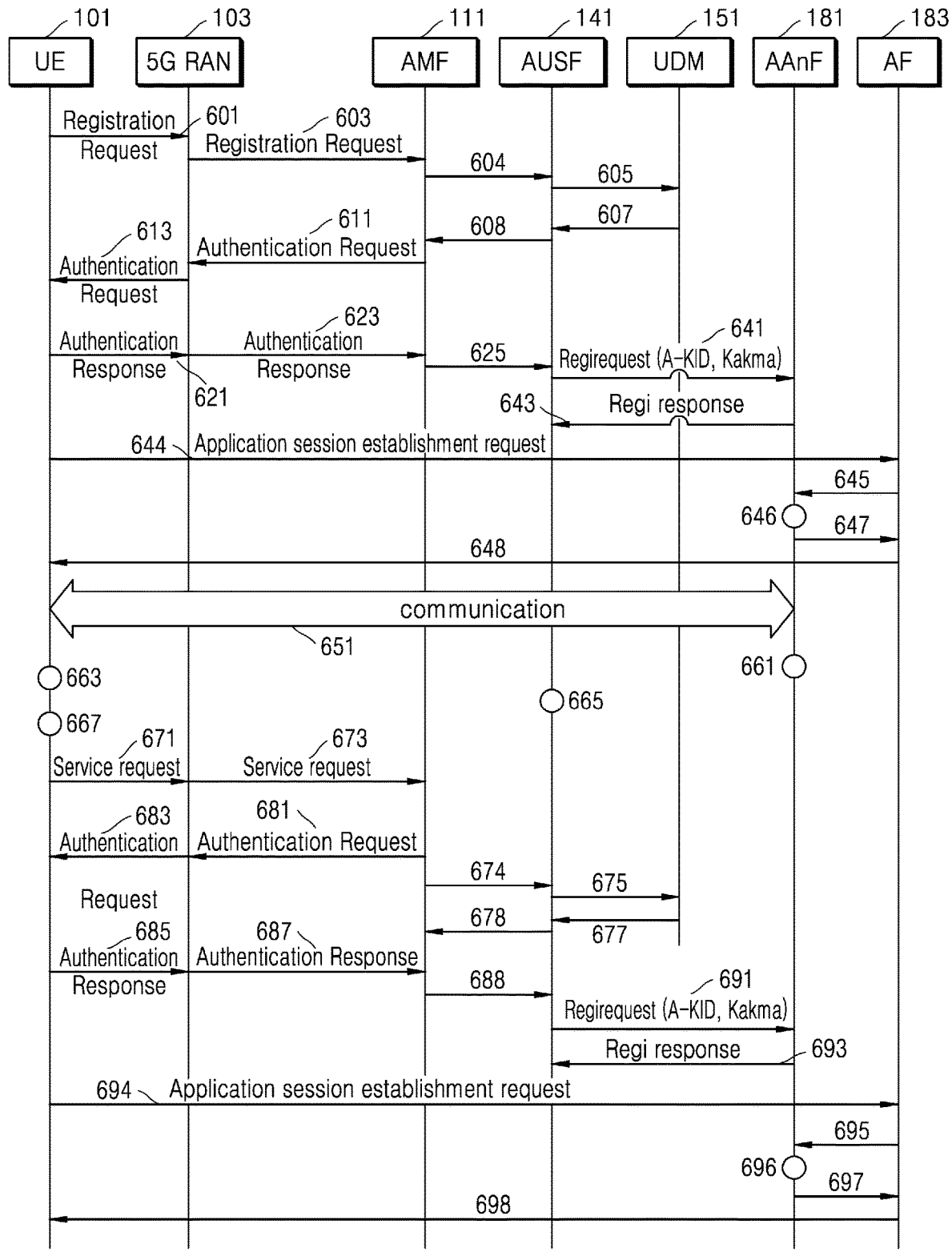
FIG. 6 illustrates a flowchart for describing a procedure for supporting security of an application in a 5G network, according to an embodiment of the present disclosure.

FIG. 6 illustrates a flowchart for describing a procedure for supporting security of an application in a 5G network, according to an embodiment of the present disclosure.

An embodiment of the present disclosure relates to a UE-based triggering method using a service request message so as to support security of an application.

In operations 601 and 603, a UE transmits a REGISTRATION REQUEST message to an AMF.

In operation 604, the AMF transmits a UEAuthentication_authentication request message to an AUSF.

In operation 605, the AUSF transmits a UEAuthentication_authentication_get_request message to a UDM.

In operation 607, when the UDM receives the UEAuthentication_authentication_get_request message, the UDM generates an authentication vector. The UDM transmits an authentication_get_response message to the AUSF.

In operation 608, the AUSF transmits a UEAuthentication_authentication response message to the AMF.

In operations 611 and 613, the AMF transmits an AUTHENTICATION REQUEST message to the UE.

In operations 621 and 623, the UE transmits an AUTHENTICATION RESPONSE message to the AMF.

In operation 625, the AMF transmits a UEAuthentication_authentication request message to the AUSF.

In operation 641, the AUSF transmits an AnchorKey_Register request message to an AAnF. In this operation, A-KID that is an identifier for identifying the UE and a key, and $K_{AKMA}$ that is a seed of generating the key may be transmitted together.

In operation 643, the AAnF transmits an AnchorKey_Register response message to the AUSF.

In operation 644, the UE transmits an application session establishment request message to the application function.

In operation 645, the application function transmits a request message including A-KID and AF-ID so as to receive, by asking the AAnF, $K_{AF}$ used by the AF and the UE to communicate.

In operation 646, the AAnF derives $K_{AF}$ from $K_{AKMA}$.

In operation 647, the AAnF transmits information to the AF, the information being associated with $K_{AF}$ used by the AF to communicate with the UE and $K_{AF}$ exptime (i.e., an expiration time of $K_{AF}$).

In operation 648, the AF transmits an application session establishment response message to the UE. In operation 651, the UE and the AAnF perform communication by executing an application.

In operation 660-1, a timer of AF security key $K_{AF}$ used by the AF to communicate with the UE is expired.

That is, in 660-1, the AF may identify that the security key $K_{AF}$ is expired.

In another embodiment, as in operation 661, the AAnF may identify expiration of the security key $K_{AF}$.

In operation 663, a timer of AF security key $K_{AF}$ used by the UE to communicate with the AF is expired.

However, in operations 665 and 667, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 671, the UE may transmit a rekey request message to the AMF to refresh an AF-associated key.

Here, as a security key $K_{AF}$ used by the AF is expired in the UE, as illustrated in FIG. 1, the application layer of the UE, i.t., the upper layer, may notify the NAS layer that $K_{AKMA}$ that is a master key has to be updated to generate a new key.

Afterward, in operations 671 and 673, the UE may perform triggering on the AMF to newly perform an authentication process so as to refresh the AF-associated key.

In this triggering, as in operations 671 and 673, a service request message may be used in an embodiment.

In an embodiment, the service request message used therefor may include identity information such as SUCI, 5G-GUTI, or the like. Also, as the registration request message is a message for triggering an authentication request message due to expiration of an application security key $K_{AF}$, the registration request message may include indication or associated information indicating that there is a need to renew authentication.

That is, the AMF receives a registration request from the UE in operations 671 and 673. The registration request triggers the AMF to transmit, to the AUSF, the UEAuthentication_authentication request for the AUSF to update $K_{AKMA}$.

Therefore, a form of the message of 671 and 673 is as in Table 8. Referring to Table 8, a $K_{AKMA}$ key refresh indication information element indicating necessity of refreshing of the $K_{AKMA}$ key is included in the message, and thus, the necessity of $K_{AKMA}$ key refresh may be indicated. Also, the message may include an AKMA indication information element. When the UE is a terminal enabled for an AKMA service and a subscription of the UE is enabled for the AKMA service, the AKMA indication information element may be used to notify a network that the corresponding service is available.

Also, the AKMA indication information element may be used together with the $K_{AKMA}$ key refresh indication, thereby indicating the necessity of <<img3>> key refresh.

As the AMF receives the rekey request message, the AMF may perform triggering of authentication on the AUSF as in 674, 675, 677, and 678. That is, the AMF transmits a UEAuthentication_authentication request message to the AUSF.

When the AUSF receives the UEAuthentication_authentication request message, the AUSF updates $K_{AUSF}$ $K_{AMF}$.

Also, when the UE receives the AKMA indication information element or the $K_{AKMA}$ key refresh indication via the authentication request message, the UE updates $K_{AKMA}$ key and $K_{AF}$ key.

In another embodiment, cause or authentication request indication may be included. The authentication request indication may be used as a notice to indicate triggering of primary authentication, upon reception of the message. That is, when the AMF receives the message, the AMF may transmit the UEAuthentication_authentication request message to the AUSF so as to trigger primary authentication.

Alternatively, it may be notified, by including a cause information element in the message, that a primary authentication procedure is triggered as the application security key $K_{AF}$ is expired.

TABLE 8

Service REQUEST message

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Service request message identity | Message type | M | V | 1 |
| | ngKSI | NAS key set identifier | M | V | ½ |
| | 5GS mobile identity/5G-S-TMSI | 5GS mobile identity 9.11.3.4 | M | LV-E | 6-n |
| | AKMA indication | | O | | |
| | AKMA refresh indication | | O | | |
| | Cause | | | | |
| | Authentication request indi | | | | |

In operation 674, the AMF transmits a UEAuthentication_authentication request message to the AUSF.

In operation 675, the AUSF transmits a UEAuthentication_authentication_get_request message to the UDM.

In operation 677, when the UDM receives the UEAuthentication_authentication_get_request message, the UDM generates an authentication vector. The UDM transmits an authentication_get_response message to the AUSF.

In operation 678, the AUSF transmits a UEAuthentication_authentication response message to the AMF.

Afterward, in operations 681 and 683, the AMF may transmit an authentication request message to the UE.

In operations 681 and 683, the AMF may transmit an AUTHENTICATION REQUEST message to the UE.

Therefore, a form of the message is as in Table 9. Referring to Table 9, a $K_{AKMA}$ key refresh-sync indication information element indicating necessity of refreshing of the $K_{AKMA}$ key is included in the message, and thus, $K_{AKMA}$ key refresh completion by the AUSF may be indicated. Also, the message may include an AKMA indication information element.

When the UE is a terminal enabled for an AKMA service and a subscription of the UE is enabled for the AKMA service, the AKMA indication information element may be used to notify the UE that the corresponding service is available. In another embodiment, the AKMA indication information element may be used to notify that update is also requested for the UE when update of AKMA key $K_{AKMA}$ key is performed in a network. Also, the AKMA indication information element and the $K_{AKMA}$ key refresh-sync indication may be used together to indicate that $K_{AKMA}$ key refresh is completed.

When the UE receives the authentication request message, the UE updates $K_{AUSF}$ and $K_{AMF}$.

Also, when the UE receives the AKMA indication information element or the $K_{AKMA}$ key refresh indication in the authentication request message, the UE updates $K_{AKMA}$ key and $K_{AF}$ key.

TABLE 9

AUTHENTICATION REQUEST

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | ABBA | ABBA | M | LV | 3-n |
| | Authentication parameter RAND (5G authentication challenge) | Authentication parameter RAND | O | TV | 17 |
| | Authentication parameter AUTN (5G authentication challenge) | Authentication parameter AUTN | O | TLV | 18 |
| | EAP message | EAP message | O | TLV-E | 7-1503 |
| | AKMA indication | | | | |
| | $K_{AKMA}$ refresh sync indication | | | | |

In operations 685 and 687, the UE may transmit an AUTHENTICATION RESPONSE message to the AMF.

In operation 688, the AMF transmits a UEAuthentication_authentication request message to the AUSF.

In operation 691, the AUSF transmits an AnchorKey_Register request message to the AAnF. In this operation, A-KID that is an identifier for identifying the UE and a key and $K_{AKMA}$ that is a seed of key generation may be transmitted together.

In operation 693, the AAnF transmits an AnchorKey_Register response message to the AUSF.

In operation 694, the UE transmits an application session establishment request message to the application function.

In operation 695, the application function transmits a request message including A-KID and AF-ID so as to receive, by asking the AAnF, $K_{AF}$ used by the AF and the UE to communicate.

In operation 696, the AAnF derives $K_{AF}$ from $K_{AKMA}$.

In operation 697, the AAnF transmits information to the AF, the information being associated with $K_{AF}$ used by the AF to communicate with the UE and $K_{AF}$ exptime (i.e., an expiration time of $K_{AF}$).

In operation 698, the AF transmits an application session establishment response message to the UE.

Figure 7:
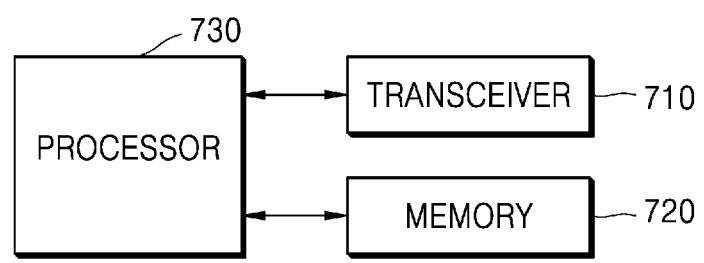
FIG. 7 illustrates a configuration of a user equipment (UE) according to an embodiment of the present disclosure.

FIG. 7 illustrates a configuration of the UE according to an embodiment of the present disclosure.

As illustrated in FIG. 7, the UE of the present disclosure may include a transceiver 710, a memory 720, and a processor 730. The processor 730, the transceiver 710, and the memory 720 of the UE may operate according to the communication method of the UE described above. However, elements of the UE are not limited to the example above. For example, the UE may include more elements than the aforementioned elements or may include fewer elements than the aforementioned elements. In addition, the processor 730, the transceiver 710, and the memory 720 may be implemented as one chip.

A receiver of the UE and a transmitter of the UE may be collectively referred to as the transceiver 710, and the transceiver 710 may transmit or receive a signal to or from a BS or a network entity. The signal transmitted to or received from the BS may include control information and data. To this end, the transceiver 710 may include a radio frequency (RF) transmitter for up-converting and amplifying a frequency of signals to be transmitted, and an RF receiver for low-noise-amplifying and down-converting a frequency of received signals. However, this is merely an example of the transceiver 710, and thus elements of the transceiver 710 are not limited to the RF transmitter and the RF receiver.

Also, the transceiver 710 may include a wired or wireless transceiver, and may include various configurations for transceiving signals.

Also, the transceiver 710 may receive a signal via a wireless channel and output the signal to the processor 730, and may transmit a signal output from the processor 730, via a wireless channel.

Also, the transceiver 710 may receive and output a communication signal to the processor, and may transmit a signal output from the processor to the network entity via a wired or wireless network.

The memory 720 may store programs and data necessary for operations of the UE. Also, the memory 720 may store control information or data which are included in a signal obtained by the UE. The memory 720 may be implemented as a storage medium including a read-only memory (ROM), a random-access memory (RAM), a hard disk, a compact disc (CD)-ROM, a digital versatile disc (DVD), or the like, or any combination thereof.

The processor 730 may control a series of processes to allow the UE to operate according to the aforementioned embodiments of the present disclosure. The processor 730 may include at least one processor. For example, the processor 730 may include a communication processor (CP) configured to perform a control for communication, and an application processor (AP) configured to control an upper layer such as an application program, or the like.

Figure 8:
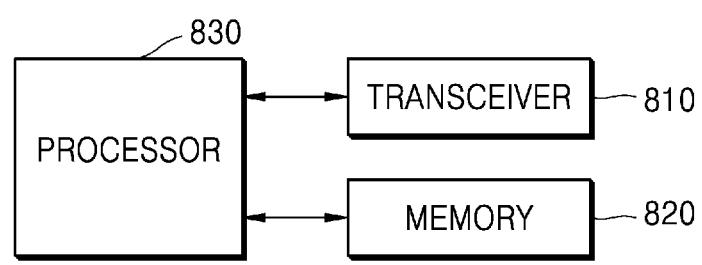
FIG. 8 illustrates a configuration of a network entity according to an embodiment of the present disclosure.

FIG. 8 illustrates a configuration of a network entity according to an embodiment of the present disclosure. The network entity may be one of the AMF, the AUSF, the AAnF, and the AF which are described above.

As illustrated in FIG. 8, the network entity of the present disclosure may include a transceiver 810, a memory 820, and a processor 830. The processor 830, the transceiver 810, and the memory 820 of the network entity may operate according to the communication method of the network entity described above. However, elements of the network entity are not limited to the example above. For example, the network entity may include more elements than the aforementioned elements or may include fewer elements than the aforementioned elements. In addition, the processor 830, the transceiver 810, and the memory 820 may be implemented as one chip. The network entity may include NFs including the AMF, the SMF, the PCF, a network exposure function (NEF), the UDM, the UPF, or the like, which are described above. Also, the network entity may include a BS.

A receiver of the network entity and a transmitter of the network entity may be collectively referred to as the transceiver 810, and the transceiver 810 may transmit or receive a signal to or from a UE or another network entity. The transmitted or received signal may include control information and data. To this end, the transceiver 810 may include an RF transmitter for up-converting and amplifying a frequency of signals to be transmitted, and an RF receiver for low-noise-amplifying and down-converting a frequency of received signals. However, this is merely an example of the transceiver 810, and thus elements of the transceiver 810 are not limited to the RF transmitter and the RF receiver. Also, the transceiver 810 may include a wired or wireless transceiver, and may include various configurations for transceiving signals.

Also, the transceiver 810 may receive a signal via a communication channel (e.g., a wireless channel) and output the signal to the processor 830, and may transmit a signal output from the processor 830, via a communication channel.

Also, the transceiver 810 may receive and output a communication signal to the processor, and may transmit a signal output from the processor to the UE or another network entity via a wired or wireless network.

The memory 820 may store programs and data necessary for operations of the network entity. Also, the memory 820 may store control information or data which are included in a signal obtained by the network entity. The memory 820 may be implemented as a storage medium including a ROM, a RAM, a hard disk, a CD-ROM, a DVD, or the like, or any combination thereof.

The processor 830 may control a series of processes to allow the network entity to operate according to the aforementioned embodiments of the present disclosure. The processor 830 may include at least one processor. The methods according to the embodiments of the present disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

Figure 9:
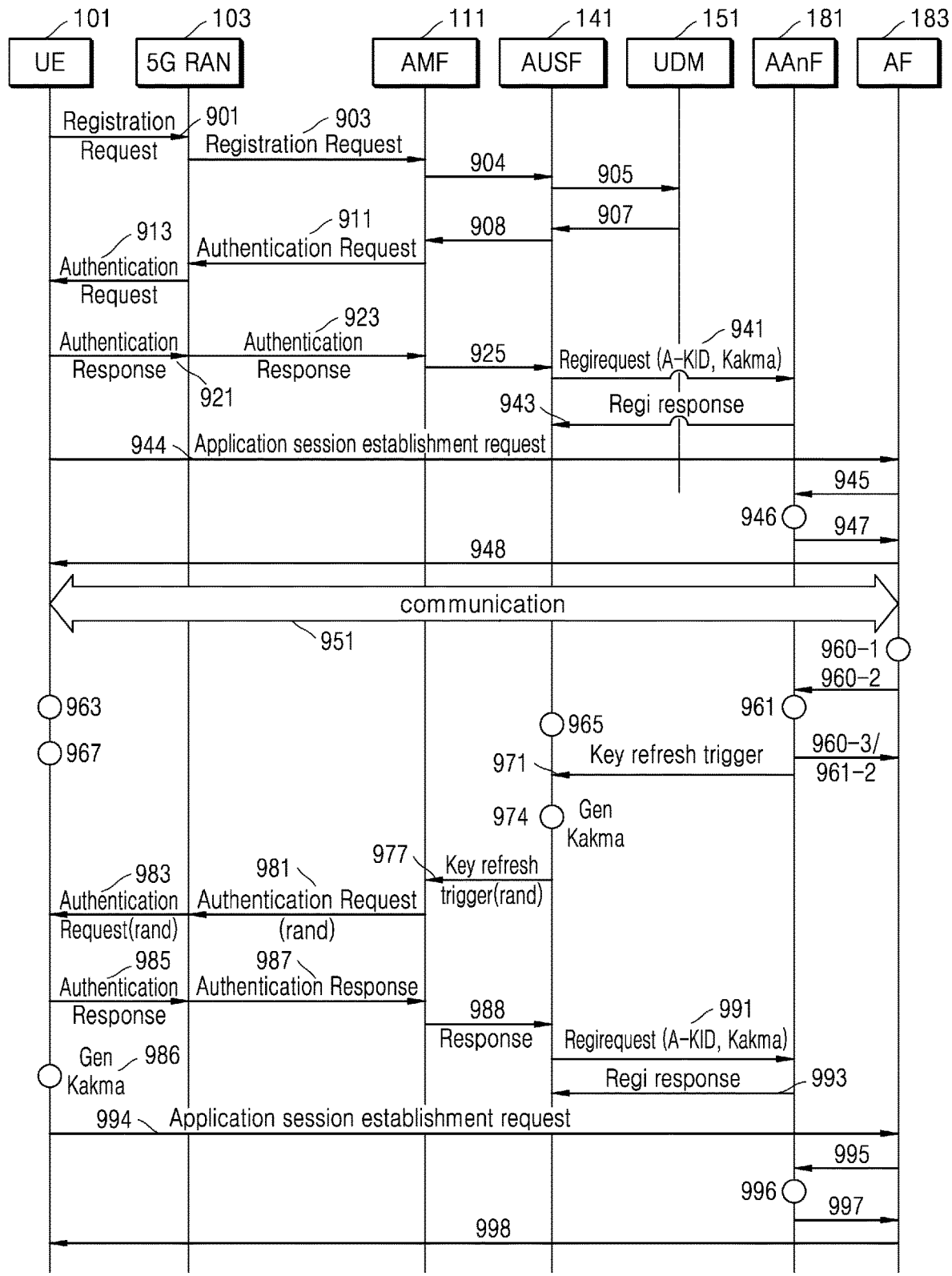
FIG. 9 illustrates a flowchart for describing a procedure for supporting security of an application in a 5G network, according to an embodiment of the present disclosure.

FIG. 9 illustrates a flowchart for describing a procedure for supporting security of an application in a 5G network, according to an embodiment of the present disclosure.

An embodiment of the present disclosure relates to a network-based triggering method for supporting security of an application. In operations 901 and 903, a UE transmits a REGISTRATION REQUEST message to an AMF.

In operation 904, the AMF transmits a UEAuthentication_authentication request message to an AUSF.

In operation 905, the AUSF transmits a UEAuthentication_authentication_get_request message to a UDM.

In operation 907, when the UDM receives the UEAuthentication_authentication_get_request message, the UDM generates an authentication vector. The UDM transmits an authentication_get_response message to the AUSF.

In operation 908, the AUSF transmits a UEAuthentication_authentication response message to the AMF.

In operations 911 and 913, the AMF transmits an AUTHENTICATION REQUEST message to the UE.

In operations 921 and 923, the UE transmits an AUTHENTICATION RESPONSE message to the AMF.

In operation 925, the AMF transmits a UEAuthentication_authentication request message to the AUSF.

In operation 941, the AUSF transmits an AnchorKey_Register request message to an AAnF. In this operation, A-KID that is an identifier for identifying the UE and a key, and $K_{AKMA}$ that is a seed of generating the key may be transmitted together.

In operation 943, the AAnF transmits an AnchorKey_Register response message to the AUSF.

In operation 944, the UE transmits an application session establishment request message to the application function.

In operation 945, the application function transmits a request message including A-KID and AF-ID so as to receive, by asking the AAnF, $K_{AF}$ used by the AF and the UE to communicate.

In operation 946, the AAnF derives $K_{AF}$ from $K_{AKMA}$.

In operation 947, the AAnF transmits information to the AF, the information being associated with $K_{AF}$ used by the AF to communicate with the UE and $K_{AF}$ exptime (i.e., an expiration time of $K_{AF}$).

In operation 948, the AF transmits an application session establishment response message to the UE.

In operation 951, the UE and the AAnF perform communication by executing an application.

In operation 960-1, a timer of AF security key $K_{AF}$ used by the AF to communicate with the UE is expired.

In this case, in an embodiment, the AF may operate as in 960-1, 960-2, and 960-3. That is, in 960-1, the AF may identify that the security key $K_{AF}$ is expired. As in 960-2, the AF may notify the AAnF that $K_{AF}$ is expired in the AF. A message indicating the expiration may simultaneously notify that it is requested to generate a new key and be transmitted from the AF to the AUSF such that key generation may be triggered. As in 960-3, the AAnF transmits a response message to the AF.

In another embodiment, as in operation 961, the AAnF may identify expiration of the security key $K_{AF}$. Therefore, in an embodiment, the AAnF may trigger necessity of generation of a security key to the AUSF. In this case, as in 961-2, the AAnF may notify the AF that the AAnF updates the security key $K_{AF}$.

In operation 963, a timer of AF security key $K_{AF}$ used by the UE to communicate with the AF is expired.

However, in operations 965 and 967, while $K_{AKMA}$ used by the UE and the AUSF is a master key that is a seed of a security key used by the UE and the AF, a $K_{AKMA}$ a key is not expired. However, according to the current standard, the AUSF cannot identify that the corresponding key is expired and can command to regenerate or refresh corresponding key $K_{AF}$ only when the AUSF identifies.

Therefore, in operation 971, the AAnF may transmit a message for triggering key fresh so as to allow the AUSF to generate a $K_{AKMA}$ key and to generate a $K_{AF}$ key based on the generated new $K_{AKMA}$ key, by notifying the AUSF that the AF key $K_{AF}$ is expired. In an embodiment, a new message for performing such function may be defined, and the AAnF may transmit the key refresh triggering message to the AUSF.

In operation 971, when the AUSF receives the key refresh triggering message from the AAnF, the AUSF may notify that from an upper layer to layer 3 that a new $K_{AKMA}$ key has to be updated. When the request for dating the $K_{AKMA}$ key is transmitted from the upper layer, i.e., the application layer, to layer 3, layer 3 of the AUSF generates new $K_{AKMA}$.

Afterward, in operation 974, the AUSF may generate a $K_{AKMA}$ KEY. The generated $K_{AKMA}$ may be calculated by using Equation below.

In an embodiment, RAND, i.e., a random number, may be used as an input value.

An input key is $K_{AUSF}$.
FC=0x80;
P0="AKMA";
L0=length of "AKMA"; (i.e. 0x00 0x04)
P1=SUPI;
L1=length of SUPI.
P2=RAND (random number)
L2=length of RAND In this manner, a value of the RAND random number, etc. which is used by the AUSF to generate the $K_{AKMA}$ KEY in operation 974 may be transmitted from the AUSF to the AMF and the UE via operations 977, 981, and 983.

In an embodiment, a process of triggering operation 977 in operation 971 may correspond to a process in which the upper layer of the AUSF, i.e., the application layer, transmits a notice to a layer corresponding to layer 3, thereby triggering the process.

In another embodiment, a process of triggering operation 977 in operation 971 may correspond to
a process in which the upper layer of the AUSF, i.e., the application layer, transmits a notice to a layer corresponding to layer 3, thereby triggering the process.

In operation 977, the AUSF may transmit a key refresh triggering message to the AMF so as to refresh a $K_{AKMA}$ key of the UE.

Alternatively, in another embodiment, in operation 977, the AUSF transmits a UEAuthentication_authentication response message to the AMF. In this case, the authentication response message may perform key refresh triggering so as to refresh the $K_{AKMA}$ key.

In operations 981 and 983, the AMF may transmit an AUTHENTICATION REQUEST message to the UE.

The authentication request message used in operations 981 and 983 may perform key refresh triggering so as to refresh the $K_{AKMA}$ key of the UE.

Therefore, a form of the message is as in Table 10. Referring to Table 10, a $K_{AKMA}$ key refresh indication information element indicating necessity of refreshing of the $K_{AKMA}$ key is included in the message, and thus, the necessity of $K_{AKMA}$ key refresh may be indicated. Also, the message may include an AKMA indication information element. When the UE is a terminal enabled for an AKMA service and a subscription of the UE is enabled for the AKMA service, the AKMA indication information element may be used to notify the UE that the corresponding service is available. Also, the AKMA indication information element may be used together with the $K_{AKMA}$ key refresh indication, thereby indicating the necessity of <<img3>> key refresh.

As the UE receives the authentication request message, the UE updates $K_{AUSF}$ and $K_{AMF}$.

Also, when the UE receives the AKMA indication information element or the $K_{AKMA}$ key refresh indication in the authentication request message, the UE updates $K_{AKMA}$ key and $K_{AF}$ key.

TABLE 10

AUTHENTICATION REQUEST

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | ½ |
|  | Spare half octet | Spare half octet | M | V | ½ |
|  | Authentication request message identity | Message type | M | V | 1 |
|  | ngKSI | NAS key set identifier | M | V | ½ |
|  | Spare half octet | Spare half octet | M | V | ½ |
|  | ABBA | ABBA | M | LV | 3-n |
|  | Authentication parameter RAND (5G authentication challenge) | Authentication parameter RAND | O | TV | 17 |
|  | Authentication parameter AUTN (5G authentication challenge) | Authentication parameter AUTN | O | TLV | 18 |
|  | EAP message | EAP message | O | TLV-E | 7-1503 |
|  | AKMA indication |  |  |  |  |
|  | $K_{AKMA}$ refresh indication |  |  |  |  |
|  | AKMA RAND | AKMA RAND |  |  |  |

An AKMA RAND information element may be included in the authentication request message, and the RAND random number may be used by the UE to update and generate the AKMA key that is $K_{AKMA}$.

Equation therefor is as below.
An input key is $K_{AUSF}$.
FC=0x80;
P0="AKMA";
L0=length of "AKMA"; (i.e. 0x00 0x04)
P1=SUPI;
L1=length of SUPI.
P2=RAND (random number)
L2=length of RAND In operations 985 and 987, the UE may transmit an AUTHENTICATION RESPONSE message to the AMF.

In operation 986, in an embodiment, the UE may generate $K_{AKMA}$ by using RAND as an input value, based on Equation below.

In operation 988, the AMF transmits a UEAuthentication_authentication request message to the AUSF.

In operation 991, the AUSF transmits an AnchorKey_Register request message to the AAnF. In this operation, A-KID that is an identifier for identifying the UE and a key and $K_{AKMA}$ that is a seed of key generation may be transmitted together.

In operation 993, the AAnF transmits an AnchorKey_Register response message to the AUSF.

In operation 994, the UE transmits an application session establishment request message to the application function.

In operation 995, the application function transmits a request message including A-KID and AF-ID so as to receive, by asking the AAnF, $K_{AF}$ used by the AF and the UE to communicate.

In operation 996, the AAnF derives $K_{AF}$ from $K_{AKMA}$.

In operation 997, the AAnF transmits information to the AF, the information being associated with $K_{AF}$ used by the AF to communicate with the UE and $K_{AF}$ exptime (i.e., an expiration time of $K_{AF}$).

In operation 998, the AF transmits an application session establishment response message to the UE.

Figure 10:
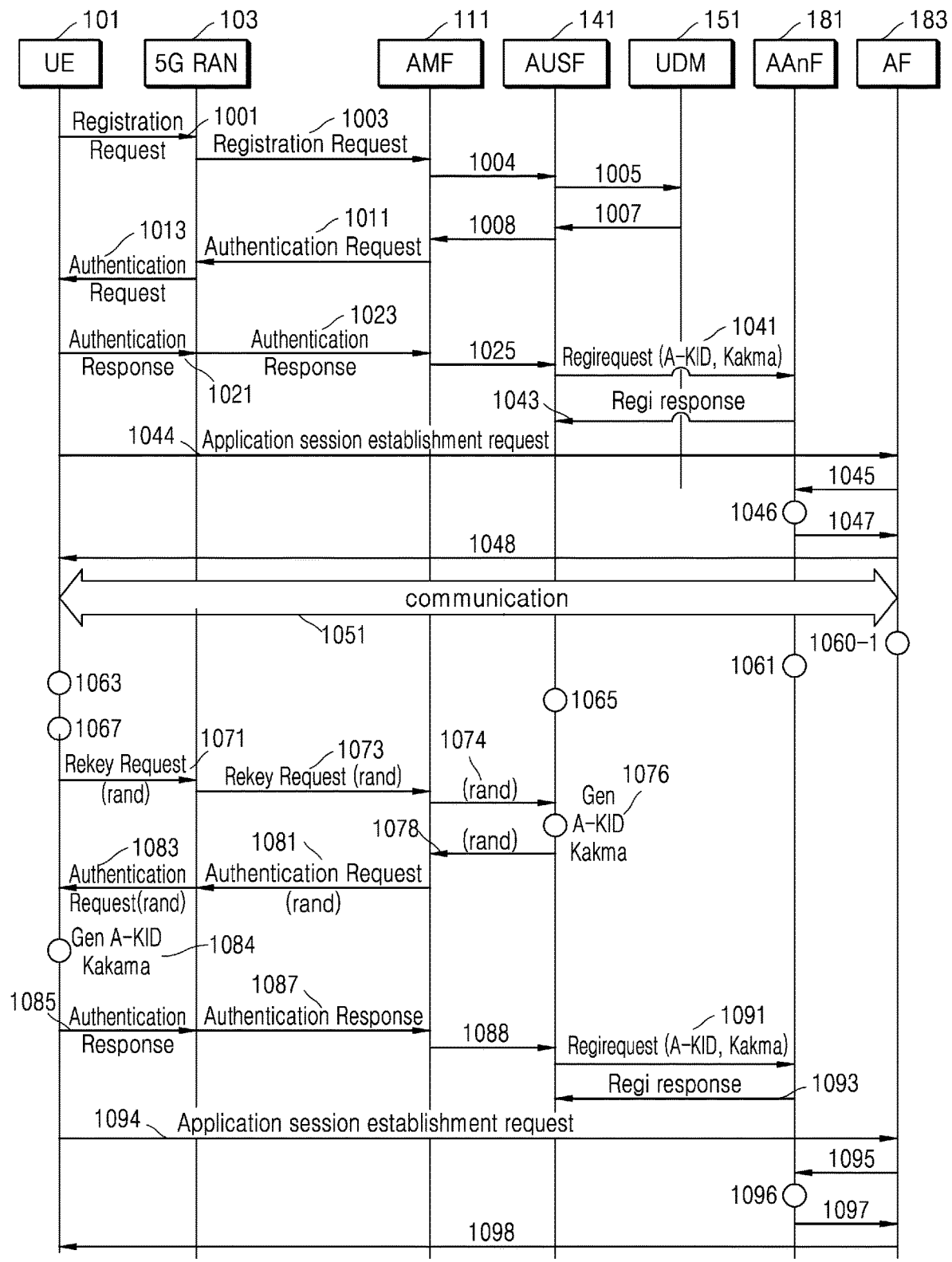
FIG. 10 illustrates a flowchart for describing a procedure for supporting security of an application in a 5G network, according to an embodiment of the present disclosure.

FIG. 10 illustrates a flowchart for describing a procedure for supporting security of an application in a 5G network, according to an embodiment of the present disclosure.

An embodiment of the present disclosure relates to a UE-based triggering method using a new message so as to support security of an application.

In operations 1001 and 1003, a UE transmits a REGISTRATION REQUEST message to an AMF.

In operation 1004, the AMF transmits a UEAuthentication_authentication request message to an AUSF.

In operation 1005, the AUSF transmits a UEAuthentication_authentication_get_request message to a UDM.

In operation 1007, when the UDM receives the UEAuthentication_authentication_get_request message, the UDM generates an authentication vector. The UDM transmits an authentication_get_response message to the AUSF.

In operation 1008, the AUSF transmits a UEAuthentication_authentication response message to the AMF.

In operations 1011 and 1013, the AMF transmits an AUTHENTICATION REQUEST message to the UE.

In operations 1021 and 1023, the UE transmits an AUTHENTICATION RESPONSE message to the AMF.

In operation 1025, the AMF transmits a UEAuthentication_authentication request message to the AUSF.

In operation 1041, the AUSF transmits an AnchorKey_Register request message to an AAnF. In this operation, A-KID that is an identifier for identifying the UE and a key, and $K_{AKMA}$ that is a seed of generating the key may be transmitted together.

In operation 1043, the AAnF transmits an AnchorKey_Register response message to the AUSF.

In operation 1044, the UE transmits an application session establishment request message to the application function.

In operation 1045, the application function transmits a request message including A-KID and AF-ID so as to receive, by asking the AAnF, $K_{AF}$ used by the AF and the UE to communicate.

In operation 1046, the AAnF derives $K_{AF}$ from $K_{AKMA}$.

In operation 1047, the AAnF transmits information to the AF, the information being associated with $K_{AF}$ used by the AF to communicate with the UE and $K_{AF}$ exptime (i.e., an expiration time of $K_{AF}$).

In operation 1048, the AF transmits an application session establishment response message to the UE. In operation 1051, the UE and the AAnF perform communication by executing an application.

In operation 1060-1, a timer of AF security key $K_{AF}$ used by the AF to communicate with the UE is expired.

That is, in 1060-1, the AF may identify that the security key $K_{AF}$ is expired.

In another embodiment, as in operation 1061, the AAnF may identify expiration of the security key $K_{AF}$.

In operation 1063, a timer of AF security key $K_{AF}$ used by the UE to communicate with the AF is expired.

However, in operations 1065 and 1067, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

Therefore, in operation 1071, the UE may transmit a rekey request message to the AMF to refresh an AF-associated key.

Here, as a security key $K_{AF}$ used by the AF is expired in the UE, as illustrated in FIG. 1, the application layer of the UE, i.t., the upper layer, may notify the NAS layer that $K_{AKMA}$ that is a master key has to be updated to generate a new key.

Afterward, in operations 1071 and 1073, the UE may perform triggering on the AMF to newly perform an authentication process so as to refresh the AF-associated key.

In this triggering, as in operations 1071 and 1073, a new message may be defined and used in an embodiment. The new message is a rekey request message.

Here, in an embodiment, the rekey request message is described as an example of the newly-defined message, however, a registration request in another embodiment or a service request message in another embodiment may be used to transmit associated information to trigger an operation.

In an embodiment, the new rekey request message used therefor in operations 1071 and 1073 may include identity information such as SUCI, 5G-GUTI, or the like. Also, as the rekey request message is a message for triggering an authentication request message due to expiration of an application security key $K_{AF}$, the rekey request message may include indication or associated information indicating that there is a need to renew authentication.

Also, in another embodiment, the message requesting a rekey may include information about RAND that is a random number.

The included RAND random number may be used in generation of $K_{AKMA}$ as below.

That is, the AMF receives the rekey request from the UE in operations 1071 and 1073. The registration request triggers the AMF to transmit, to the AUSF, the UEAuthentication_authentication request for the AUSF to update $K_{AKMA}$.

Therefore, a form of the message of 1071 and 1073 is as in Table 11. Referring to Table 11, a $K_{AKMA}$ key refresh indication information element indicating necessity of refreshing of the $K_{AKMA}$ key is included in the message, and thus, the necessity of KAKMA key refresh may be indicated. Also, the message may include an AKMA indication information element. When the UE is a terminal enabled for an AKMA service and a subscription of the UE is enabled for the AKMA service, the AKMA indication information element may be used to notify a network that the corresponding service is available.

Also, the AKMA indication information element may be used together with the $K_{AKMA}$ key refresh indication, thereby indicating the necessity of <<img3>> key refresh.

As the AMF receives the rekey request message, the AMF may perform triggering of authentication on the AUSF as in 374, 375, 377, and 378. That is, the AMF transmits a UEAuthentication_authentication request message to the AUSF.

When the AUSF receives the UEAuthentication_authentication request message, the AUSF updates $K_{AUSF}$ $K_{AMF}$.

Also, when the UE receives the AKMA indication information element or the $K_{AKMA}$ key refresh indication in the authentication request message, the UE updates $K_{AKMA}$ key and $K_{AF}$ key.

In another embodiment, cause or authentication request indication may be included. The authentication request indication may be used as a notice to indicate triggering of primary authentication, upon reception of the message. That is, when the AMF receives the message, the AMF may transmit the UEAuthentication_authentication request message to the AUSF so as to trigger primary authentication.

Alternatively, it may be notified, by including a cause information element in the message, that a primary authentication procedure is triggered as the application security key $K_{AF}$ is expired.

TABLE 11

| | | Rekey REQUEST message | | | |
|---|---|---|---|---|---|
| IEI | Information Element | Type/Reference | Presence | Format | Length |
| | Extended protocol discriminator | Extended protocol discriminator | M | V | 1 |
| | Security header type | Security header type | M | V | ½ |
| | Spare half octet | Spare half octet | M | V | ½ |
| | Rekey Rrequest message identity | Message type | M | V | 1 |
| | ngKSI | NAS key set identifier | M | V | ½ |
| | 5GS mobile identity | 5GS mobile identity | M | LV-E | 6-n |
| | AKMA indication | | O | | |
| | AKMA refresh indication | | O | | |
| | Cause | | | | |
| | Authentication request indi | | | | |
| | AKMA RAND | | | | |

An AKMA rand random number information element is provided to transmit a random number requested to update an AKMA key that is KAKMA.

In operation 1074, the AMF transmits a UEAuthentication_authentication request message to the AUSF. In this operation, a value such as a rand value, a random number, etc. which is used to update KAKMA and is transmitted from the UE, may be transmitted.

In operation 1076, in an embodiment, the AUSF may use the received rand random number to generate KAKMA, as below. In an embodiment, the AUSF may use the received rand random number to generate A-KID, as below.

Equation for generation of KAKMA is as below.
An input key is $K_{AUSF}$.
FC=0x80;
P0="AKMA";
L0=length of "AKMA"; (i.e. 0x00 0x04)
P1=SUPI;
L1=length of SUPI.
P2=RAND (random number)
L2=length of RAND Equation for generation of A-TID forming a portion of A-KID is as below.
An input key is $K_{AUSF}$.
FC=0x81;
P0="A-TID";
L0=length of "A-TID"; (i.e. 0x00 0x05)
P1=SUPI;
L1=length of SUPI.
P2=RAND (random number)
L2=length of RAND In an embodiment, A-KID consists of a routing identifier, an A-TID, and a home network identifier.

In an embodiment, RAND used in generating KAKMA may be a random number transmitted by the UE.

In another embodiment, RAND used in generating KAKMA may be a random number transmitted by the AUSF.

When it is the random number RAND generated by the AUSF, the corresponding RAND may be notified to the UE via operations 1078, 1081, and 1083, such that the UE generates KAKMA by using the same RAND.

In operation 1078, the AUSF transmits a UEAuthentication_authentication response message to the AMF.

Afterward, in operations 1081 and 1083, the AMF may transmit an authentication request message to the UE.

In operations 1078, 1081, and 1083, in an embodiment, rand random number information to be transmitted from the AUSF to the UE may be included in the message and transmitted.

In operations 1081 and 1083, the AMF may transmit an AUTHENTICATION REQUEST message to the UE.

In operation 1084, in an embodiment, the UE may use a received/transmitted rand random number to generate KAKMA, as below. In an embodiment, the UE may use a received/transmitted rand random number to generate A-KID, as below.

Equation for generation of KAKMA is as below.
Input key is $K_{AUSF}$.
FC=0x80;
P0="AKMA";
L0=length of "AKMA"; (i.e. 0x00 0x04)
P1=SUPI;
L1=length of SUPI.
P2=RAND (random number)
L2=length of RAND Equation for generation of A-TID forming a portion of A-KID is as below.
An input key is $K_{AUSF}$.
FC=0x81;
P0="A-TID";
L0=length of "A-TID"; (i.e. 0x00 0x05)
P1=SUPI;
L1=length of SUPI.
P2=RAND (random number)
L2=length of RAND In an embodiment, A-KID consists of a routing identifier, an A-TID, and a home network identifier.

In an embodiment, RAND used in generating KAKMA may be a random number transmitted by the UE.

In another embodiment, RAND used in generating KAKMA may be a random number transmitted by the AUSF.

When it is the random number RAND generated by the AUSF, the AUSF notifies the corresponding RAND to the UE via operations 1078, 1081, and 1083, such that the UE generates KAKMA by using the same RAND as the AUSF.

Referring to FIG. 10, it is shown that operation 1084 is performed after operation 1083, but this is merely an embodiment, and operation 1084 may be performed after operation 1071.

In operations 1085 and 1087, the UE may transmit an AUTHENTICATION RESPONSE message to the AMF.

In operation 1088, the AMF transmits a UEAuthentication_authentication request message to the AUSF.

In operation 1091, the AUSF transmits an AnchorKey_Register request message to the AAnF. In this operation, A-KID that is an identifier for identifying the UE and a key and $K_{AKMA}$ that is a seed of key generation may be transmitted together.

In operation 1093, the AAnF transmits an AnchorKey_Register response message to the AUSF.

In operation 1094, the UE transmits an application session establishment request message to the application function.

In operation 1095, the application function transmits a request message including A-KID and AF-ID so as to receive, by asking the AAnF, $K_{AF}$ used by the AF and the UE to communicate.

In operation 1096, the AAnF derives $K_{AF}$ from $K_{AKMA}$.

In operation 1097, the AAnF transmits information to the AF, the information being associated with $K_{AF}$ used by the AF to communicate with the UE and $K_{AF}$ exptime (i.e., an expiration time of $K_{AF}$).

In operation 1098, the AF transmits an application session establishment response message to the UE.

Figure 11:
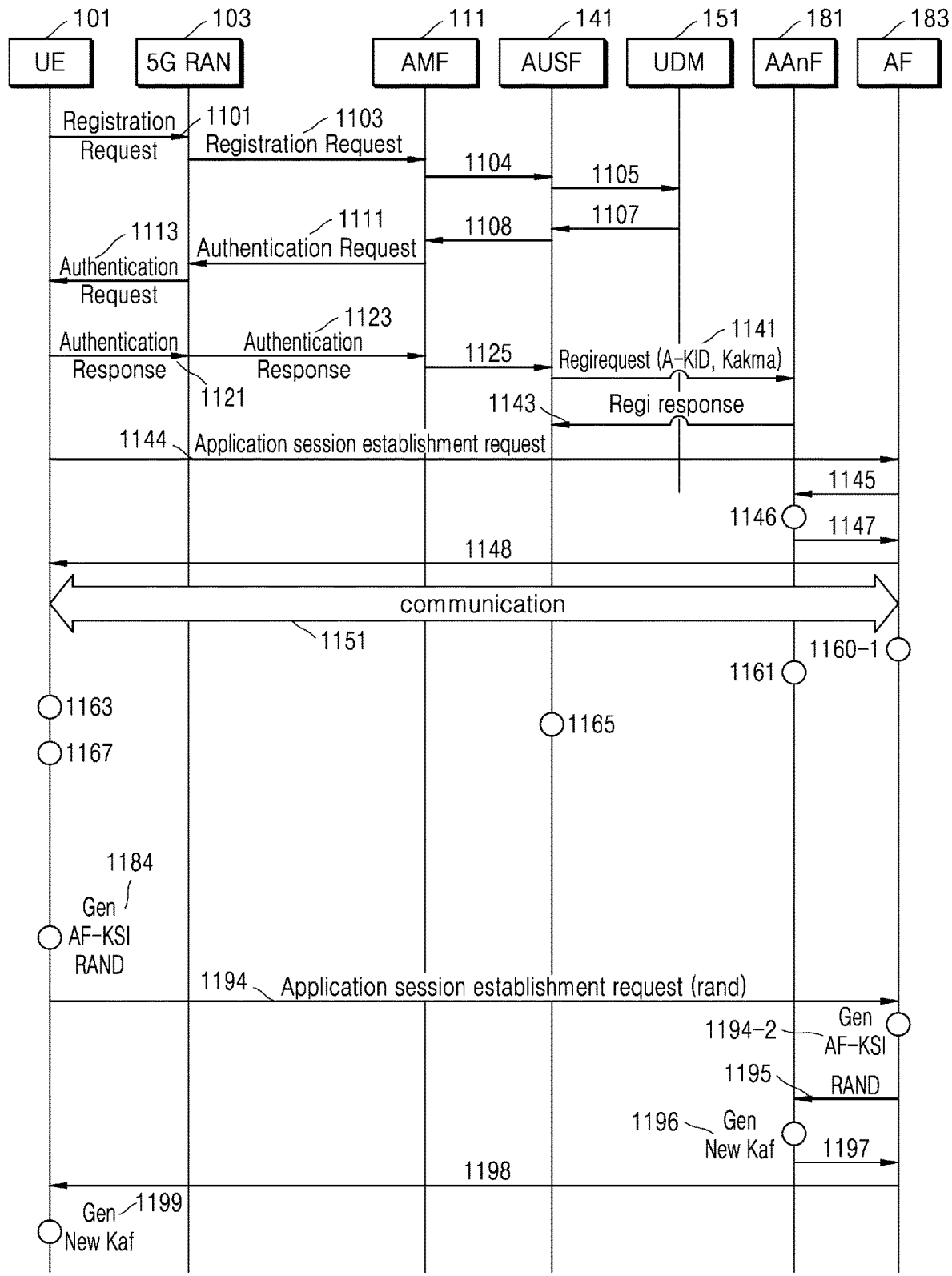
FIG. 11 illustrates a flowchart for describing a procedure for supporting security of an application in a 5G network, according to an embodiment of the present disclosure.

FIG. 11 illustrates a flowchart for describing a procedure for supporting security of an application in a 5G network, according to an embodiment of the present disclosure.

An embodiment of the present disclosure relates to a UE-based triggering method using a new message so as to support security of an application.

In operations 1101 and 1103, a UE transmits a REGISTRATION REQUEST message to an AMF.

In operation 1104, the AMF transmits a UEAuthentication_authentication request message to an AUSF.

In operation 1105, the AUSF transmits a UEAuthentication_authentication_get_request message to a UDM.

In operation 1107, when the UDM receives the UEAuthentication_authentication_get_request message, the UDM generates an authentication vector. The UDM transmits an authentication_get_response message to the AUSF.

In operation 1108, the AUSF transmits a UEAuthentication_authentication response message to the AMF.

In operations 1111 and 1113, the AMF transmits an AUTHENTICATION REQUEST message to the UE.

In operations 1121 and 1123, the UE transmits an AUTHENTICATION RESPONSE message to the AMF.

In operation 1125, the AMF transmits a UEAuthentication_authentication request message to the AUSF.

In operation 1141, the AUSF transmits an AnchorKey_Register request message to an AAnF. In this operation, A-KID that is an identifier for identifying the UE and a key, and $K_{AKMA}$ that is a seed of generating the key may be transmitted together.

In operation 1143, the AAnF transmits an AnchorKey_Register response message to the AUSF.

In operation 1144, the UE transmits an application session establishment request message to the application function.

In operation 1145, the application function transmits a request message including A-KID and AF-ID so as to receive, by asking the AAnF, $K_{AF}$ used by the AF and the UE to communicate.

In operation 1146, the AAnF derives $K_{AF}$ from $K_{AKMA}$.

In operation 1147, the AAnF transmits information to the AF, the information being associated with $K_{AF}$ used by the AF to communicate with the UE and $K_{AF}$ exptime (i.e., an expiration time of $K_{AF}$).

In operation 1148, the AF transmits an application session establishment response message to the UE. In operation 1151, the UE and the AAnF perform communication by executing an application.

In operation 1160-1, a timer of AF security key $K_{AF}$ used by the AF to communicate with the UE is expired.

That is, in 1160-1, the AF may identify that the security key $K_{AF}$ is expired.

In another embodiment, as in operation 1161, the AAnF may identify expiration of the security key $K_{AF}$.

In operation 1163, a timer of AF security key $K_{AF}$ used by the UE to communicate with the AF is expired.

However, in operations 1165 and 1167, while $K_{AKMA}$ used by the UE and the AUSF is a master key that is a seed of a security key used by the UE and the AF, a <<img2>> key is not expired. However, according to the current standard, the AUSF cannot identify that the corresponding key is expired and can command to regenerate or refresh corresponding key $K_{AF}$ only when the AUSF identifies.

In operation 1184, the UE generates AF-KSI, and generates a RAND value.

In operation 1194, the UE transmits an application session establishment request message to the application function. Here, the UE may transmit the application session establishment request message by having the RAND value included therein.

In operation 1194-2, the AF generates an identifier referred to as AF-KSI.

In operation 1195, the application function transmits a request message including A-KID and AF-ID so as to receive, by asking the AAnF, $K_{AF}$ used by the AF and the UE to communicate. Also, the AF transmits the RAND value together with the AF-KSI to the AAnF.

In operation 1196, the AAnF derives $K_{AF}$ from $K_{AKMA}$. Equation therefor is as below.

FC=0x82;
P0=AF_ID;
AF_ID=FQDN of the AF||Ua* security protocol identifier,
L0=length of AF_ID
P1=RAND
L1=length of RAND
An input key is $K_{AKMA}$.

In operation 1197, the AAnF transmits information to the AF, the information being associated with $K_{AF}$ used by the AF to communicate with the UE and $K_{AF}$ exptime (i.e., an expiration time of $K_{AF}$).

In operation 1198, the AF transmits an application session establishment response message to the UE.

In operation 1199, the UE derives $K_{AF}$ from $K_{AKMA}$. Equation therefor is as below.

FC=0x82;
P0=AF_ID;
AF_ID=FQDN of the AF||Ua* security protocol identifier,
L0=length of AF_ID
P1=RAND
L1=length of RAND
An input key is $K_{AKMA}$.

Figure 12:
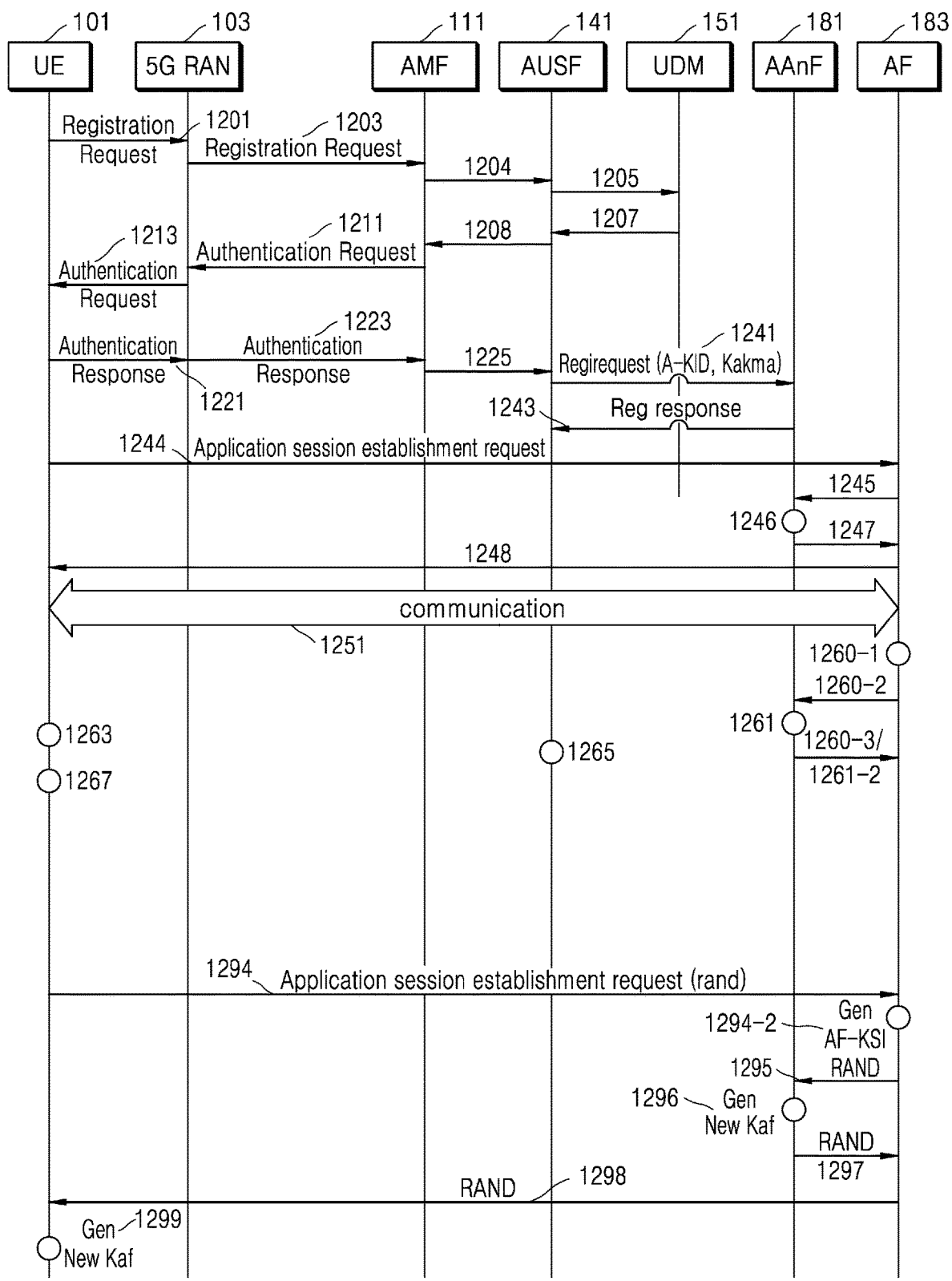
FIG. 12 illustrates a flowchart for describing a procedure for supporting security of an application in a 5G network, according to an embodiment of the present disclosure.

FIG. 12 illustrates a flowchart for describing a procedure for supporting security of an application in a 5G network, according to an embodiment of the present disclosure.

An embodiment of the present disclosure relates to a network-based triggering method for supporting security of an application. In operations 1201 and 1203, a UE transmits a REGISTRATION REQUEST message to an AMF.

In operation 1204, the AMF transmits a UEAuthentication_authentication request message to an AUSF.

In operation 1205, the AUSF transmits a UEAuthentication_authentication_get_request message to a UDM.

In operation 1207, when the UDM receives the UEAuthentication_authentication_get_request message, the UDM generates an authentication vector. The UDM transmits an authentication_get_response message to the AUSF.

In operation 1208, the AUSF transmits a UEAuthentication_authentication response message to the AMF.

In operations 1211 and 1213, the AMF transmits an AUTHENTICATION REQUEST message to the UE.

In operations 1221 and 1223, the UE transmits an AUTHENTICATION RESPONSE message to the AMF.

In operation 1225, the AMF transmits a UEAuthentication_authentication request message to the AUSF.

In operation 1241, the AUSF transmits an AnchorKey_Register request message to an AAnF. In this operation, A-KID that is an identifier for identifying the UE and a key, and $K_{AKMA}$ that is a seed of generating the key may be transmitted together.

In operation 1243, the AAnF transmits an AnchorKey_Register response message to the AUSF.

In operation 1244, the UE transmits an application session establishment request message to the application function.

In operation 1245, the application function transmits a request message including A-KID and AF-ID so as to receive, by asking the AAnF, $K_{AF}$ used by the AF and the UE to communicate.

In operation 1246, the AAnF derives $K_{AF}$ from $K_{AKMA}$.

In operation 1247, the AAnF transmits information to the AF, the information being associated with $K_{AF}$ used by the AF to communicate with the UE and $K_{AF}$ exptime (i.e., an expiration time of $K_{AF}$).

In operation 1248, the AF transmits an application session establishment response message to the UE.

In operation 1251, the UE and the AAnF perform communication by executing an application.

In operation 1260-1, a timer of AF security key $K_{AF}$ used by the AF to communicate with the UE is expired.

In this case, in an embodiment, the AF may operate as in 1260-1, 1260-2, and 1260-3. That is, in 1260-1, the AF may identify that the security key $K_{AF}$ is expired. As in 1260-2, the AF may notify the AAnF that $K_{AF}$ is expired in the AF. A message indicating the expiration may simultaneously notify that it is requested to generate a new key and be transmitted from the AF to the AUSF such that key generation may be triggered. As in 1260-3, the AAnF transmits a response message to the AF.

In another embodiment, as in operation 1261, the AAnF may identify expiration of the security key $K_{AF}$. Therefore, in an embodiment, the AAnF may trigger necessity of generation of a security key to the AUSF. In this case, as in 1261-2, the AAnF may notify the AF that the AAnF updates the security key $K_{AF}$.

In operation 1263, a timer of AF security key $K_{AF}$ used by the UE to communicate with the AF is expired.

However, in operations 1265 and 1267, while $K_{AKMA}$ used by the UE and the AUSF is a master key that is a seed of a security key used by the UE and the AF, a $K_{AKMA}$ key is not expired. However, according to the current standard, the AUSF cannot identify that the corresponding key is expired and can command to regenerate or refresh corresponding key $K_{AF}$ only when the AUSF identifies.

In operation 1294, the UE transmits an application session establishment request message to the application function.

In operation 1295, the application function transmits a request message including A-KID and AF-ID so as to receive, by asking the AAnF, $K_{AF}$ used by the AF and the UE to communicate.

In operation 1296, the AAnF derives $K_{AF}$ from $K_{AKMA}$.
Here, Equation used in generation is as below.
Equation is as below
FC=0x82;
P0=AF_ID;
AF_ID=FQDN of the AF||Ua* security protocol identifier,
L0=length of AF_ID
P1=RAND
L1=length of RAND
An input key is $K_{AKMA}$.

In operation 1297, the AAnF transmits information to the AF, the information being associated with $K_{AF}$ used by the AF to communicate with the UE and $K_{AF}$ exptime (i.e., an expiration time of $K_{AF}$).

Here, the AAnF transmits, to the AF, the RAND value used as an input value in generation of $K_{AF}$.

In operation 1298, the AF transmits an application session establishment response message to the UE. Here, the AF transmits, in a message to the UE, the RAND value used as the input value in generation of $K_{AF}$.

In operation 1299, the UE generates $K_{AF}$ by using Equation below.
Equation is as below.
FC=0x82;
P0=AF_ID;
AF_ID=FQDN of the AF||Ua* security protocol identifier,
L0=length of AF_ID
P1=RAND
L1=length of RAND
An input key is $K_{AKMA}$.

In the afore-described embodiments of the present disclosure, elements included in the present disclosure are expressed in a singular or plural form according to the embodiments of the present disclosure. However, the singular or plural form is appropriately selected for convenience of explanation and the present disclosure is not limited thereto. As such, an element expressed in a plural form may also be configured as a single element, and an element expressed in a singular form may also be configured as plural elements.

Specific embodiments of the present disclosure are described in the descriptions of the present disclosure, but it will be understood that various modifications may be made without departing the scope of the present disclosure. Thus, the scope of the present disclosure is not limited to the embodiments described herein and should be defined by the appended claims and their equivalents.

The invention claimed is:

1. A user equipment (UE) for supporting security in a wireless communication system, the UE comprising:
    a transceiver; and
    a processor coupled with the transceiver and configured to:
        in case that a security key used in communication between the UE and an application function (AF) is expired, generate a random number associated with a master key of the security key,
        transmit, to an access and mobility management function (AMF) via a base station, a key generation request message including the generated random number, and
        in case that the random number included in the key generation request message is transmitted to an authentication server function (AUSF) from the AMF and the master key is generated at the AUSF, based on the key generation request message, receive an authentication request message from the AMF via the base station, based on a message about the master key received at the AMF from the AUSF.

2. The UE of claim 1, wherein the processor is further configured to:
    based on the transmitting of the key generation request message, generate the master key, based on the random number.

3. The UE of claim 1, wherein the processor is further configured to:
    in case that the authentication request message is received from the AMF via the base station, generate the master key, based on the random number.

4. The UE of claim 1,
    wherein the authentication request message received from the AMF includes a random number used by the AMF to generate the master key, and
    wherein the processor is further configured to:
        generate the master key by using the random number generated by the UE or the random number used by the AMF to generate the master key.

5. A method of supporting security by a user equipment (UE) in a wireless communication system, the method comprising:
    in case that a security key used in communication between the UE and an application function (AF) is expired, generating a random number associated with a master key of the security key;
    transmitting, to an access and mobility management function (AMF) via a base station, a key generation request message including the generated random number; and
    in case that the random number included in the key generation request message is transmitted to an authentication server function (AUSF) from the AMF, and the master key is generated at the AUSF, based on the key generation request message, receiving an authentication request message from the AMF via the base station, based on a message about the master key received at the AMF from the AUSF.

6. The method of claim 5, further comprising:
    based on the transmitting of the key generation request message, generating the master key, based on the random number.

7. The method of claim 5, further comprising:
in case that the authentication request message is received from the AMF via the base station, generate the master key, based on the random number.

8. The method of claim 5,
wherein the authentication request message received from the AMF includes a random number used by the AMF to generate the master key, and
wherein the method further comprising:
generating the master key by using the random number generated by the UE or the random number used by the AMF to generate the master key.

9. An access and mobility management function (AMF) for supporting security in a wireless communication system, the AMF comprising:
a transceiver; and
a processor coupled with the transceiver and configured to:
in case that a security key used in communication between a user equipment (UE) and an application function (AF) is expired, receive, from the UE via a base station, a key generation request message including a random number associated with a master key of the security key, wherein the random number is generated at the UE,
transmit the random number included in the key generation request message to an authentication server function (AUSF),
receive a message about the master key from the AUSF, and
transmit, to the UE via the base station, an authentication request message based on the message about the master key.

10. The AMF of claim 9, wherein the master key is generated, based on the random number.

11. The AMF of claim 9, wherein the authentication request message includes a random number used by the AMF to generate the master key, and wherein the master key is generated by using the random number generated by the UE or the random number used by the AMF to generate the master key.

12. A method of supporting security by an access and mobility management function (AMF) in a wireless communication system, the method comprising:
in case that a security key used in communication between a user equipment (UE) and an application function (AF) is expired, receiving, from the UE via a base station, a key generation request message including a random number associated with a master key of the security key, wherein the random number is generated at the UE;
transmitting the random number included in the key generation request message to an authentication server function (AUSF);
receiving a message about the master key from the AUSF; and
transmitting, to the UE via the base station, an authentication request message based on the message about the master key.

13. The method of claim 12, wherein the master key is generated, based on the random number.

14. The method of claim 12,
wherein the authentication request message includes a random number used by the AMF to generate the master key, and
wherein the master key is generated by using the random number generated by the UE or the random number used by the AMF to generate the master key.

\* \* \* \* \*